(12) United States Patent
Zhang et al.

(10) Patent No.: US 12,143,988 B2
(45) Date of Patent: Nov. 12, 2024

(54) SYSTEMS AND METHODS FOR QCL-TYPED COLLISION HANDLING

(71) Applicant: APPLE INC., Cupertino, CA (US)

(72) Inventors: Yushu Zhang, Beijing (CN);
Chunxuan Ye, San Diego, CA (US);
Dawei Zhang, Cupertino, CA (US);
Haitong Sun, Cupertino, CA (US);
Huaning Niu, Cupertino, CA (US); Jie Cui, Cupertino, CA (US); Oghenekome Oteri, San Diego, CA (US); Qiming Li, Beijing (CN); Wei Zeng, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 329 days.

(21) Appl. No.: 17/593,477

(22) PCT Filed: Jan. 14, 2021

(86) PCT No.: PCT/CN2021/071876
§ 371 (c)(1),
(2) Date: Sep. 20, 2021

(87) PCT Pub. No.: WO2022/151226
PCT Pub. Date: Jul. 21, 2022

(65) Prior Publication Data
US 2023/0180229 A1 Jun. 8, 2023

(51) Int. Cl.
*H04W 72/1273* (2023.01)
*H04W 72/23* (2023.01)
*H04W 72/566* (2023.01)

(52) U.S. Cl.
CPC ....... *H04W 72/1273* (2013.01); *H04W 72/23* (2023.01); *H04W 72/566* (2023.01)

(58) Field of Classification Search
CPC ..... H04W 72/04; H04W 72/02; H04W 72/12; H04W 72/1273; H04W 72/566; H04W 72/23
(Continued)

(56) References Cited

U.S. PATENT DOCUMENTS

| 2010/0329221 A1* | 12/2010 | Nakano | ............. H04W 74/0816 370/336 |
| 2012/0163185 A1* | 6/2012 | Zhang | ............. H04W 36/00692 370/328 |

(Continued)

FOREIGN PATENT DOCUMENTS

| CN | 110536231 A | 12/2019 |
| EP | 3629645 A1 | 4/2020 |
| WO | 2020198645 A1 | 10/2020 |

OTHER PUBLICATIONS

LG Electronics, "Remaining issues on downlink control channel", R1-1808490, 3GPP TSG RAN WG1 Meeting #94, Gothenburg, Sweden, Agenda Item 7.1.3.1, Aug. 20-24, 2018, 9 pages.

(Continued)

*Primary Examiner* — Jean A Gelin
(74) *Attorney, Agent, or Firm* — Dorsey & Whitney LLP

(57) ABSTRACT

A UE may receive multiple signals causing a Quasi co-location TypeD (QCL-TypeD) collision. To determine which of the multiple signals to select, the UE may use a certain option based on a type transmission scheme associated with each of the multiple signals. The options may include one of a priority rule for signal reception, a scheduling restriction, or a priority rule for QCL-TypeD selection.

20 Claims, 17 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2013/0250879 | A1* | 9/2013 | Ng ...................... | H04B 7/0689 |
| | | | | 370/329 |
| 2013/0265945 | A1* | 10/2013 | He ...................... | H04W 48/18 |
| | | | | 370/329 |
| 2016/0255670 | A1* | 9/2016 | Lee ...................... | H04W 72/56 |
| | | | | 370/329 |
| 2017/0070312 | A1* | 3/2017 | Yi ....................... | H04W 72/541 |
| 2019/0306924 | A1 | 10/2019 | Zhang et al. | |
| 2020/0053705 | A1* | 2/2020 | Hwang ............... | H04W 52/146 |
| 2020/0145982 | A1 | 5/2020 | Cheng et al. | |
| 2020/0154489 | A1* | 5/2020 | Zhou ................... | H04W 56/001 |
| 2020/0366429 | A1* | 11/2020 | Huang ................. | H04W 72/542 |
| 2020/0413374 | A1 | 12/2020 | Luo et al. | |
| 2021/0135821 | A1* | 5/2021 | Guan ................... | H04L 5/0048 |
| 2021/0377914 | A1* | 12/2021 | Park .................... | H04W 8/24 |
| 2022/0007406 | A1* | 1/2022 | Matsumura .......... | H04L 5/0051 |
| 2022/0385429 | A1* | 12/2022 | Ma ...................... | H04L 5/0053 |
| 2023/0327742 | A1* | 10/2023 | Matsumura ........... | H04L 5/005 |
| | | | | 370/329 |
| 2023/0328539 | A1* | 10/2023 | Matsumura ........... | H04W 72/21 |
| 2023/0413081 | A1* | 12/2023 | Zhang ................... | H04L 5/0035 |

OTHER PUBLICATIONS

PCT/CN2021/071876 , International Search Report and Written Opinion, Sep. 28, 2021, 9 pages.

* cited by examiner

SYSTEMS AND METHODS FOR QCL-TYPED COLLISION HANDLING

TECHNICAL FIELD

This application relates generally to wireless communication systems, including systems and methods for Quasi co-location TypeD (QCL-TypeD) Collision Handling when several schemes for multi-Transmission Reception Point (TRP) based Physical Downlink Shared Channel (PDSCH) transmission are supported.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node. NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz, Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
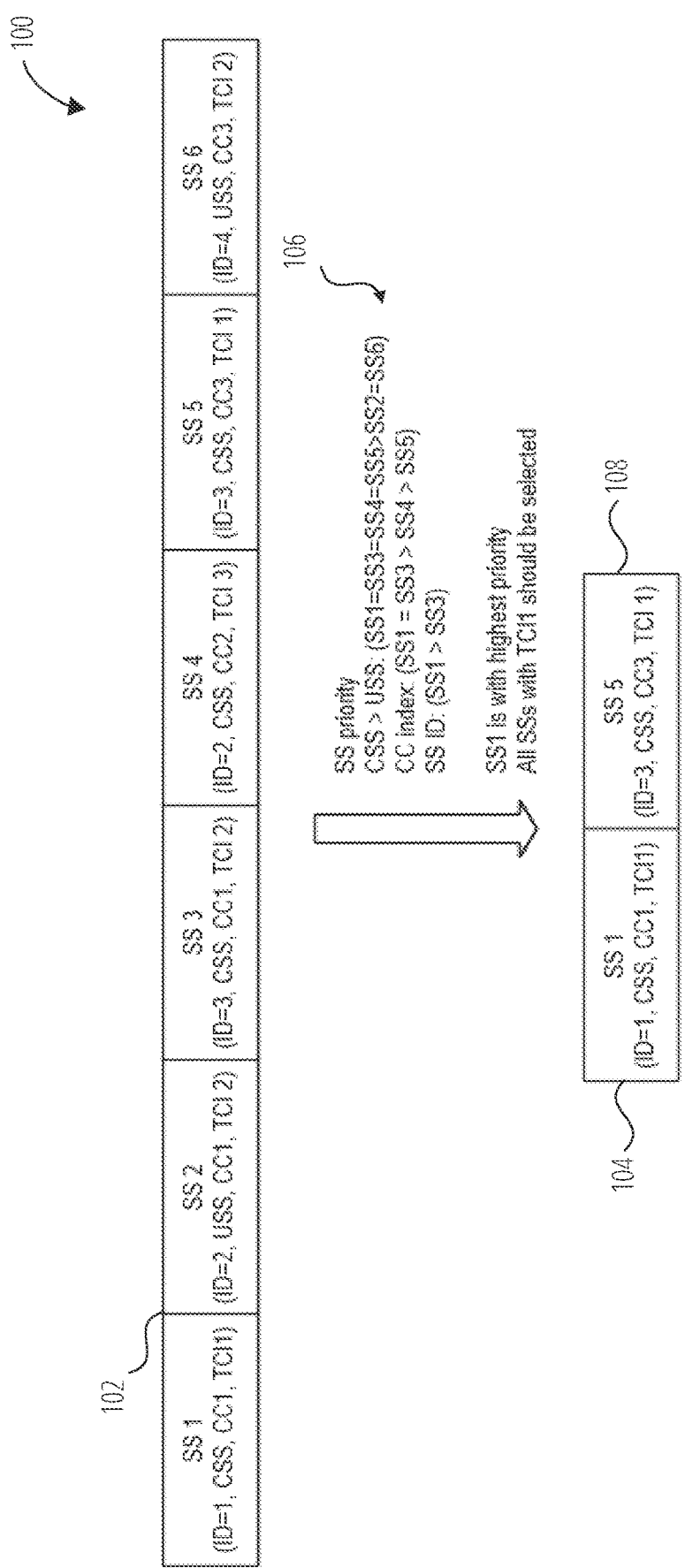
FIG. 1 illustrates an example QCL-TypeD collision and a priority rule 106 for handling such collisions in accordance with one embodiment.

Various embodiments are described with regard to a User Equipment (UF). However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Quasi co-location TypeD (QCL-TypeD) collision handling rules are defined for cases when multiple signals, from the same component carrier (CC) or different CCs within a band are overlapped in time. The QCL-TypeD collision handling rules define rules that a UE or network node (e.g., gNB) may follow for handling the following five cases.

Case 1 is when there is a Physical Downlink Shared Channel (PDSCH) with scheduling offset below a threshold and Physical Downlink Control Channel (PDCCH). In Case 1, a UE handles the collision by prioritizing the PDCCH, and the UE should use the PDCCH beam to receive both PDCCH and PDSCH.

Case 2 occurs when Channel-State Information Reference Siunal (CSI-RS) for beam management (BM) and PDCCH conflict. The UE can handle this case based on whether repetition is on or off. When the repetition is on, Case 2 may be considered as an error case. When the repetition is off, Case 2 the gNB should ensure the QCL-typeD for the CSI-RS and PDCCH be the same.

Case 3 occurs when an aperiodic CSI-RS for BM/CSI with scheduling offset below a threshold and PDCCH conflict. In Case 3 the PDCCH is prioritized and the UE should use the PDCCH beam to receive both PDCCH and aperiodic CSI-RS.

Case 4 occurs when PDSCH and Synchronization Signal Block (SSB)conflict. To handle Case 4, the gNB should ensure the QCL-typeD for the CSI-RS and PDCCH be the same.

Case 5 occurs when a first PDCCH and a second PDCCH conflict. To handle Case 5 conflicts, a priority rule may be followed. The priority rule may define that common search space (CSS) should have a higher priority than UE specific search space (USS). For the SS with the same type, SS with lower SS index in the lower CC index should have a higher priority.

Since these rules for these five cases were implemented, there have been a number of improvements and updates to communication networks. These rules for these cases where defined prior to an introduction of several schemes for multi-Transmission Reception Point (TRP) based PDSCH transmission, where two Transmission Configuration Indicator (TCI) States can be applied for PDSCH. Additionally, to improve the reliability for PDCCH, two schemes are now supported. The above rules for these five cases do not contemplate these new schemes. Embodiments herein Various operations will be described as multiple discrete operations, in turn, in a manner that is most helpful in understanding the disclosure. The order of the description, however, should not be construed to imply that these operations are necessarily order dependent. In particular, these operations need not be performed in the order of presentation.

Additional details and examples are provided with reference to the figures below. The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments.

FIG. 1 illustrates an example QCL-TypeD collision 100 and a priority rule 106 for handling such collisions. The illustrated QCL-TypeD collision 100 is a Case 5 collision. That is, as explained above, a collision between a first PDCCH signal and a second PDCCH. This particular embodiment follows the rules before introduction of several schemes for multi-TRP based PDSCH transmission was supported. Thus, the priority rule defines that CSS should have a higher priority than USS. For the SS with the same type, SS with lower SS index in the lower CC index should have a higher priority.

As shown, out of the original search spaces 102, after applying the priority rule SS1 104 and SS5 108 are selected. This is because SS1 104, SS5 108 SS4, and SS3 have priority because they are CSS. And, SS1 and SS3 are then prioritized further because of the CC index. Finally, SS1 is shown to have the highest priority because of the SS ID. Therefore all SSs with TCI1 like SS1 should be selected. This selected group includes SS1 104 and SS5 108.

This priority rule however fails to include several newly supported schemes. For example, several schemes for multi-TRP based PDSCH transmission have been or will be supported, where two TCI States can be applied for PDSCH. Scheme 1 includes PDSCH from two TRPs can be transmitted in ingle frequency network (SFN) manner. Scheme 2 includes PDSCH from 2 TRPs can be transmitted in a frequency division multiplexing (FDM) or spatial division multiplexing (SDM) manner.

Further, to improve the reliability for PDCCH, two schemes for PDCCH are also now supported. Scheme 1 is where a PDCCH can be transmitted in SFN manner. In Scheme 1, one Control Resource Set (CORESET) can be configured with two TCI states indicating different QCL-typeD. Scheme 2 is where PDCCH can be transmitted repeatedly in non-SFN manner. In Scheme 2, the PDCCH repetitions can be carried by 2 Search Spaces (SSs) or CORESETs with different TCI States. The 2 SSs may be multiplexed in FDM or time division multiplexing (TDM) manner. The 2 SSs may be assumed to be in a SS group.

The problem with the current rules, previously outlined herein, is that none of the rules account for these schemes. Embodiments herein describe how to handle the collisions for cases 1-5 for both scheme 1 and scheme 2. That is embodiments herein describe ways to handle cases 1-5 when scheme 1 is enabled, handle cases 1-5 when scheme 2 is enabled, and handle cases 1-5 when both scheme 1 and scheme 2 are enabled.

Additionally, some embodiments herein can be extended to the CCs in a band group, which should share the same QCL-TypeD property.

Figure 2A:
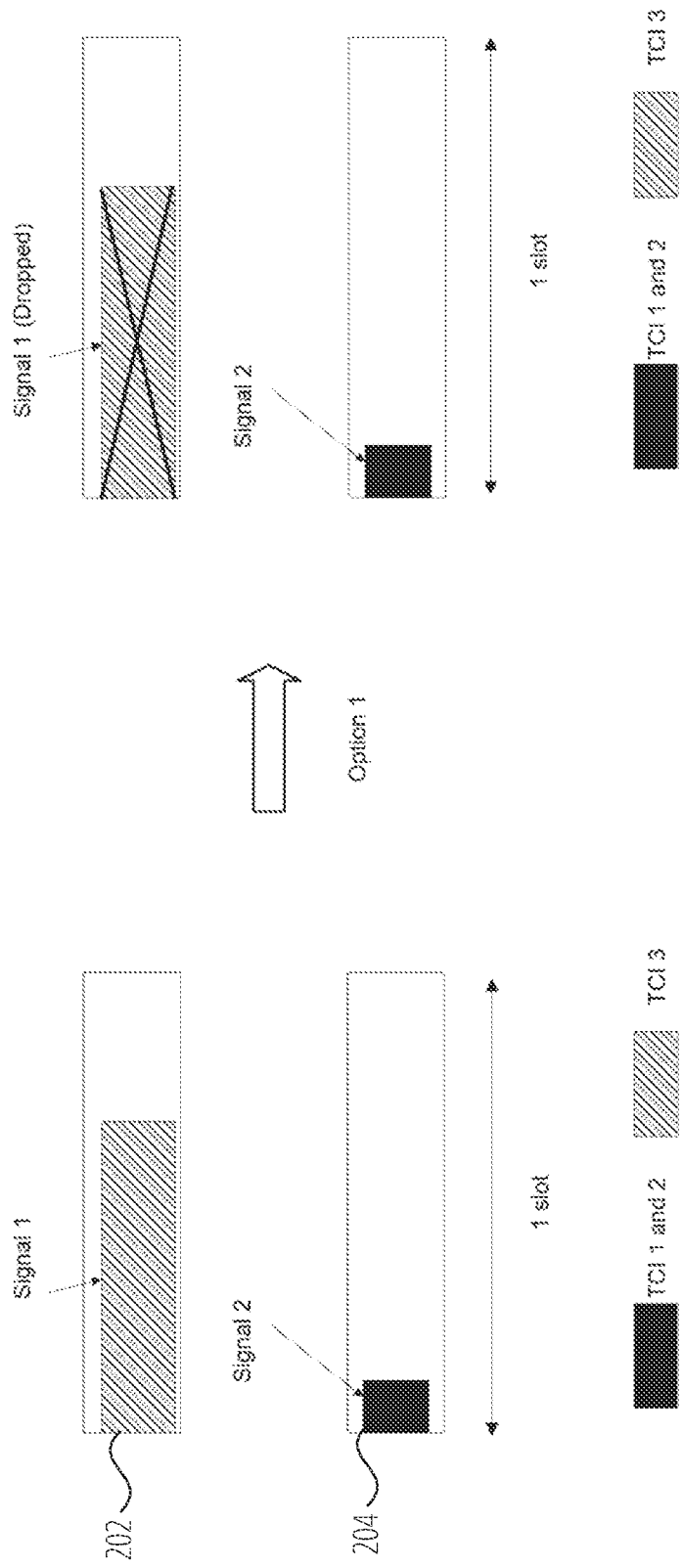
FIG. 2A illustrates a first option for handling QCL-TypeD collisions in accordance with one embodiment.
Figure 2B:
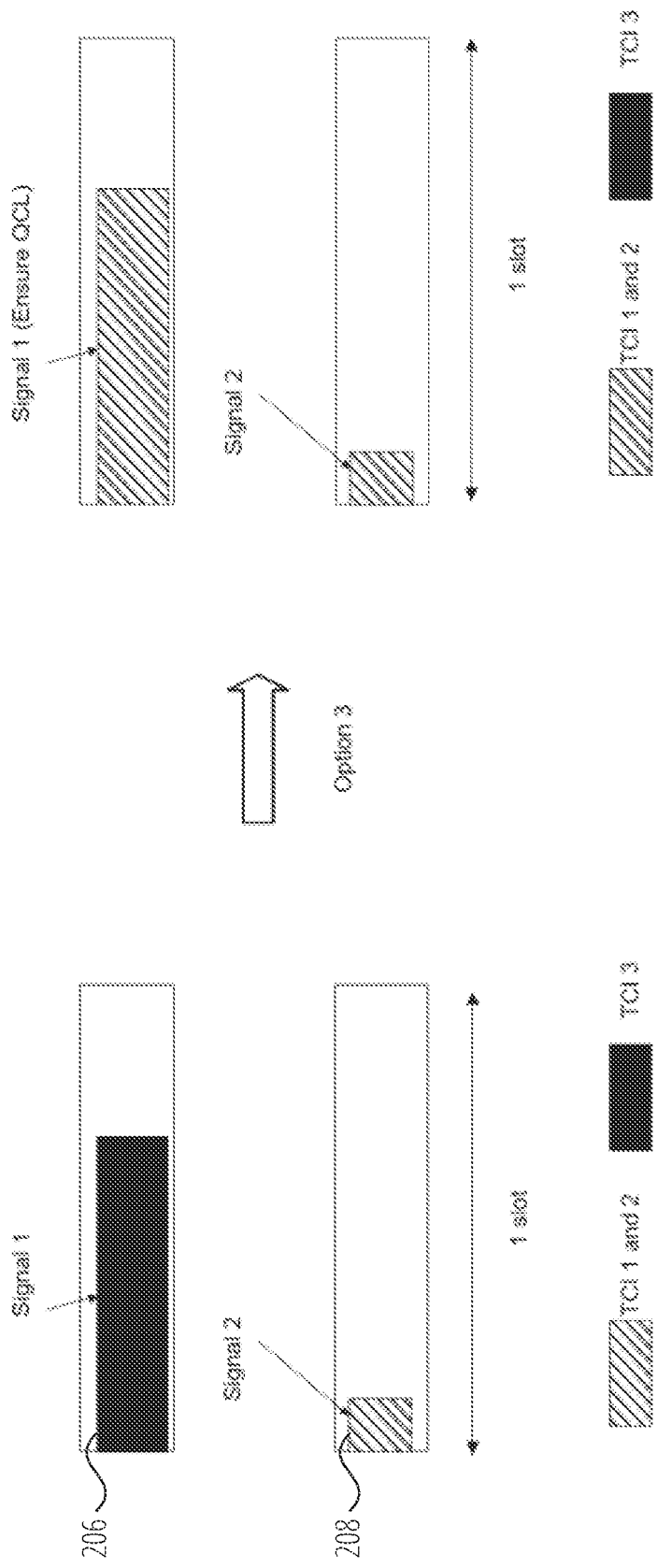
FIG. 2B illustrates another option for handling QCL-TypeD collision in accordance with one embodiment.

FIGS. 2A and 2B illustrate two ways to handle QCL-TypeD collision with the new schemes. In general, as a result of hardware constraints, UE is not able to receive signals based on multiple receiving beams.

Generally, there may be three options to handle a QCL-TypeD collision. In option 1 a priority rule may be defined for signal reception. Using option 1 may result in some signals being dropped. FIG. 2A illustrates option 1 in use. As shown, a first signal 202 and a second signal 204 arrive at the same time and the UE must decide how to handle the collision. Based on a set of priority rules, the UE receives the second signal and drops the first signal 202.

In option 2, a scheduling restriction may be defined In one example, a network node (e.g., gNB) may ensure the same QCL-TypeD properties for different signals and a QCL-TypeD collision can be considered as an error case.

In option 3, a priority rule for QCL-TypeD selection may be used. Using option 3, a UE may still receive all the signals, but with selected UE beam(s) for some signals instead of configured QCL-TypeD. FIG. 2B illustrates option 3 in use. As shown, a first signal 206 and a second signal 208 arrive at the same time and the UE must decide how to handle the collision. Based on a priority rule for QCL-TypeD selection, the UE receives both the signals, but with selected UE beam(s) for some signals instead of configured QCL-TypeD.

As shown in FIGS. 2A and 2B, the other signal not selected by the options may be disregarded. For example, in FIG. 2A the first signal 202 is dropped. Whereas in FIG. 2B the UE may still receive all the signals but prioritize certain receive beams. Accordingly, the network node may change the TCI state used for the other signal.

In some embodiments, for option 1 and 3, the priority rule may be calculated per TCI States pair. For example, one TCI State pair may indicate the downlink (DL) RSs reported by the UE, which can be received simultaneously. Alternatively, a TCI State pair may indicate the TCI States applied to a downlink signal.

The following provide additional embodiments for implementing these general options for each of the five cases of QCL-TypeD collision for network communications employing scheme 1 and/or scheme 2 for multi-TRP based PDSCH transmission and PDCCH support. Case 1 is when there is a Physical Downlink Shared Channel (PDSCH) with scheduling offset below a threshold and Physical Downlink Control Channel (PDCCH). Case 2 occurs when Channel-State Information Reference Signal (CSI-RS) for beam management (BM) and PDCCH conflict. Case 3 occurs when an aperiodic CSI-RS for BM/CSI with scheduling offset below a threshold and PDCCH conflict. Case 4 occurs when PDSCH and Synchronization Signal Block (SSB) conflict. Case 5 occurs when a first PDCCH and a second PDCCH conflict. A UE and network node handling the collision can be configured to perform one of the options listed below for each of the cases.

Case 1 when the PDCCH is Based on Scheme 1

The following describe options for handling collisions when there is a PDSCH with scheduling offset below a threshold and a PDCCH based on scheme 1.

As a first option, one of the TCI States applied for PDCCH may be used for PDSCH reception. For example, in some embodiments, whether to select the first or the second TCI can be configured by higher layer signaling. For example, an RRC parameter may be used to configure whether to select the first or the second TCI. In some embodiments, whether to select the first or the second TCI can be indicated by a scheduling Downlink Control Information (DCI). For example, a new DCI field may be introduced or an existing DCI field, such as TCI State, can be used for the TCI selection. In other embodiments, the TCI with a lowest or a highest ID can be selected. In some embodiments, the first or second TCI can be selected. In some embodiments, the TCI selection can be determined by the QCL-Type indicated in the TCI in addition to QCL-typeD (e.g., the TCI used for QCL-TypeA indication can be selected). In some embodiments, the TCI selection can be determined by the symbol or slot index.

As a second option, both TCI States applied for the PDCCH may be used for PDSCH reception. As a third option, whether to use the first option or the second option can be reported by UE capability and/or configured by higher layer signaling and/or DCI. For example, an RRC parameter may be used to configure whether to apply the first option or the second option. When the UE receives this RRC parameter indicating which TCI states to use, the UE may determine whether to apply one or two TCI states. As a fourth option, Case 1 when the PDCCH is based on scheme 1 can be considered as an error case.

Case 1 when the PDCCH is Based on Scheme 2 and 2 SSs in a Group are Multiplexed in FDM Manner The following options may be used to handle case 1 when the PDCCH is based on scheme 2 and 2 SSs in a group are multiplexed in FDM manner.

As a first option, one of the TCI States applied for PDCCH should be used for PDSCH reception. In some embodiments, whether to select TCI for the first or the second SS can be configured by higher layer signaling. For example, an RRC parameter may be used to configure whether to select the first or the second TCI. In some embodiments, whether to select TCI for the first or the second SS can be indicated by scheduling DCI. For example, a new DCI field may be introduced or an existing DCI field, such as TCI State, can be used for the TCI selection. In some embodiments, the TCI with lowest or highest ID can be selected. In some embodiments, the TCI selection can be determined by SS/CORESET index within the SS group (e.g. The TCI corresponding to the SS with lowest SS/CORESET index is selected). In some embodiments, the TCI selection can be determined by the symbol or slot index.

As a second option, both TCI States applied for the PDCCH may be used for PDSCH reception. As a third option, whether to use the first option or the second option can be reported by UE capability and/or configured by higher layer signaling and/or DCI. For example, an RRC parameter may be used to configure whether to select the first or the second TCI. As a fourth option, case 1 hen the PDCCH is based on scheme 2 and 2 SSs in a group are multiplexed in FDM manner can be considered as an error case.

Case 2 when the PDCCH is Based on Scheme 1

The following options may be used to handle case 2 when the PDCCH is based on scheme 1. As a first option, the QCL-TypeD for one of the TCI States applied for PDCCH may be the same as the QCL-TypeD configured for CSI-RS with repetition off. As a second option, this scenario may be considered as an error case.

Case 2 when the PDCCH is Based on Scheme 2 and 2 SSs in a Group are Multiplexed in FDM Manner The following options are provided to handle case 2 when the PDCCH is based on scheme 2 and 2 SSs in a group are multiplexed in FDM manner. As a first option, the QCL-TypeD for one of the SSs/CORESETs for PDCCH may be the same as the QCL-TypeD configured for CSI-RS with repetition off. As a second option this scenario may be considered as an error case Case 3 when the PDCCH is Based on Scheme 1

In some embodiments, one of the TCI States applied for PDCCH may be used for aperiodic CSI-RS reception for case 3 when the PDCCH is based on scheme 1. Alternatively, this scenario may be considered as an error case.

The following options may be used for TCI selection in this scenario. As a first option, whether to select the first or the second TCI can be configured by higher layer signaling. For example, an RRC parameter may be used to configure whether to select the first or the second TCI. As a second option, whether to select the first or the second TCI can be indicated by scheduling DCI. For example, a new DCI field may be implemented or an existing DCI field CSI request) can be used for the TCI selection. As a third option, the TCI with lowest or highest ID can be selected. As a fourth option, the first or second TCI can be selected. As a fifth option, the TCI selection can be determined by the QCL-Type indicated in the TCI in addition to QCL-typeD. For example, the TCI used for QCL-TypeA indication can be selected. As a sixth option, the TCI selection can be determined by the symbol or slot index.

Case 3 when the PDCCH is Based on Scheme 2 and 2 SSs in a Group are Multiplexed in FDM Manner In some embodiments, one of the TCI States applied for PDCCH may be used for aperiodic CSI-RS reception for case 3 when the PDCCH is based on scheme 2 and 2 SSs in a group are multiplexed in FDM manner. Alternatively, this scenario may be considered as an error case.

The following options may be used for TCI selection in this scenario. As a first option, whether to select TCI for the first or the second SS can be configured by higher layer signaling. For example, an RRC parameter may be used to configure whether to select the first or the second TCI. As a second option, whether to select TCI for the first or the second SS can be indicated by scheduling DCI. For example, a new DCI field may be implemented or an existing DCI field (e.g., CSI request) can be used for the TCI selection. As a third option, the TCI with lowest or highest ID can be selected. As a fourth option, the TCI selection can be determined by SS or CORESET index within the SS or CORESET group (e.g., the TCI corresponding to the SS with lowest SS index may be selected). As a fifth option, the TCI selection can be determined by the symbol or slot index.

Case 4 when the PDCCH is Based on Scheme 1 or Scheme 2

The following options may be used to handle case 4 when the PDSCH is based on scheme 1 or scheme 2. As a first option, the source RS to provide QCL-TypeD indication for at least one of the TCI States applied for PDSCH may be QCL-ed with SSB with QCL-TypeD. For example, in some embodiments at least one Demodulation Reference Signal (DMRS) port for the PDSCH may be QCLed with SSB with QCL-TypeD. As a second option, this scenario may be considered as an error case.

Case 5 when PDCCH Based on Scheme 1 Collides with PDCCH Based on Scheme 1

FIGS. 3-6 illustrate options that may be used to handle case 5 when PDCCH based on scheme 1 collides with PDCCH based on scheme 1 and potentially other normal PDCCH.

Figure 3:
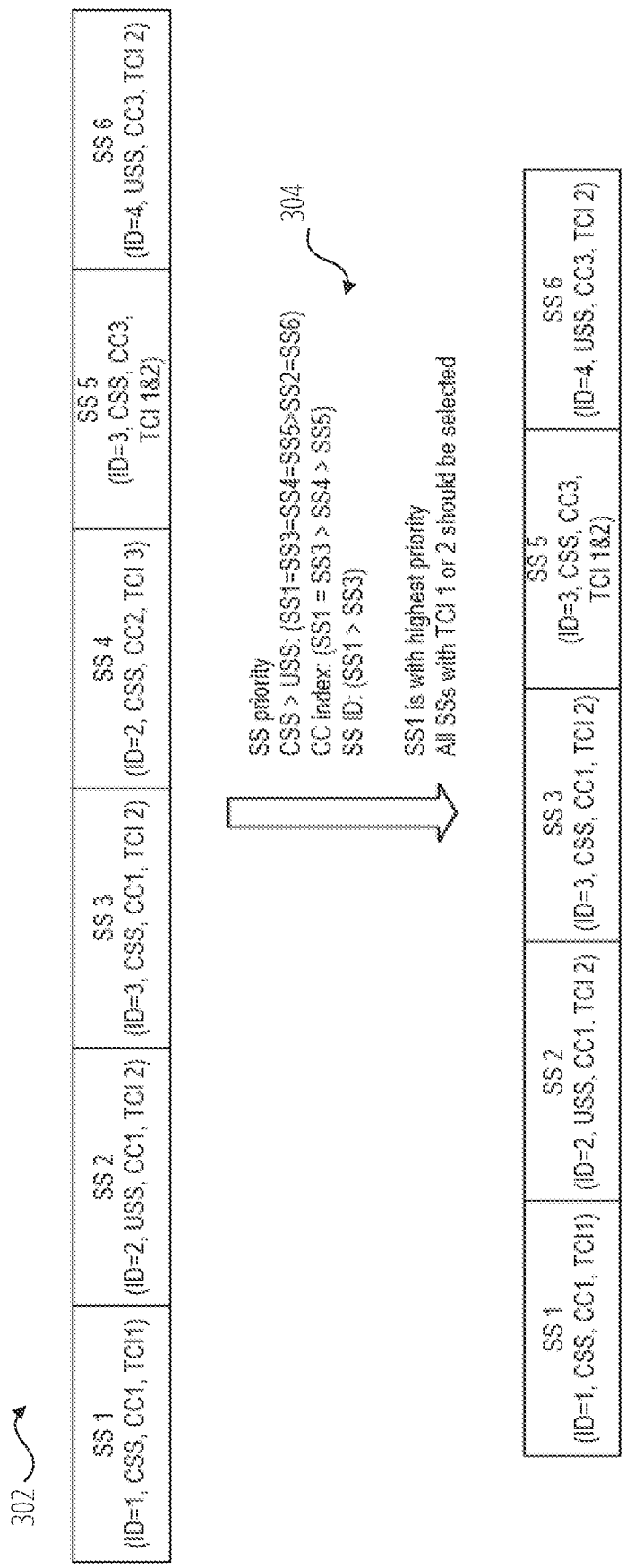
FIG. 3 illustrates an example of a case 5 collision being handled according to a first option in accordance with one embodiment.

As a first option, a priority rule may be used to select a SS or CORESET with higher priority. For example, FIG. 3 illustrates an example of a case 5 collision being handled using a priority rule 304. In the illustrated embodiment, there are a set of colliding signals with different SSs 302. A UE may apply the priority rule 304 to determine which signal to receive. In the illustrated embodiment the priority rule comprises that CSS has a greater priority than USS. Thus, SS1, SS3, SS4 and SS % are found to have a greater priority than SS2 and SS6. Additionally, the priority rule 304 further prioritizes the SSs 302 based on CC index. As shown, SS1 and SS3 are then prioritized further because of the CC index. Finally, the SSID is used to prioritize SS1 over SS3. Accordingly, SST is shown to have the highest priority because of the SS ID. Therefore, all SSs with TCI 1 or TCI 2 should be selected. This selected group includes SST, SS2, SS3, SS5, and SS6.

Figure 4:
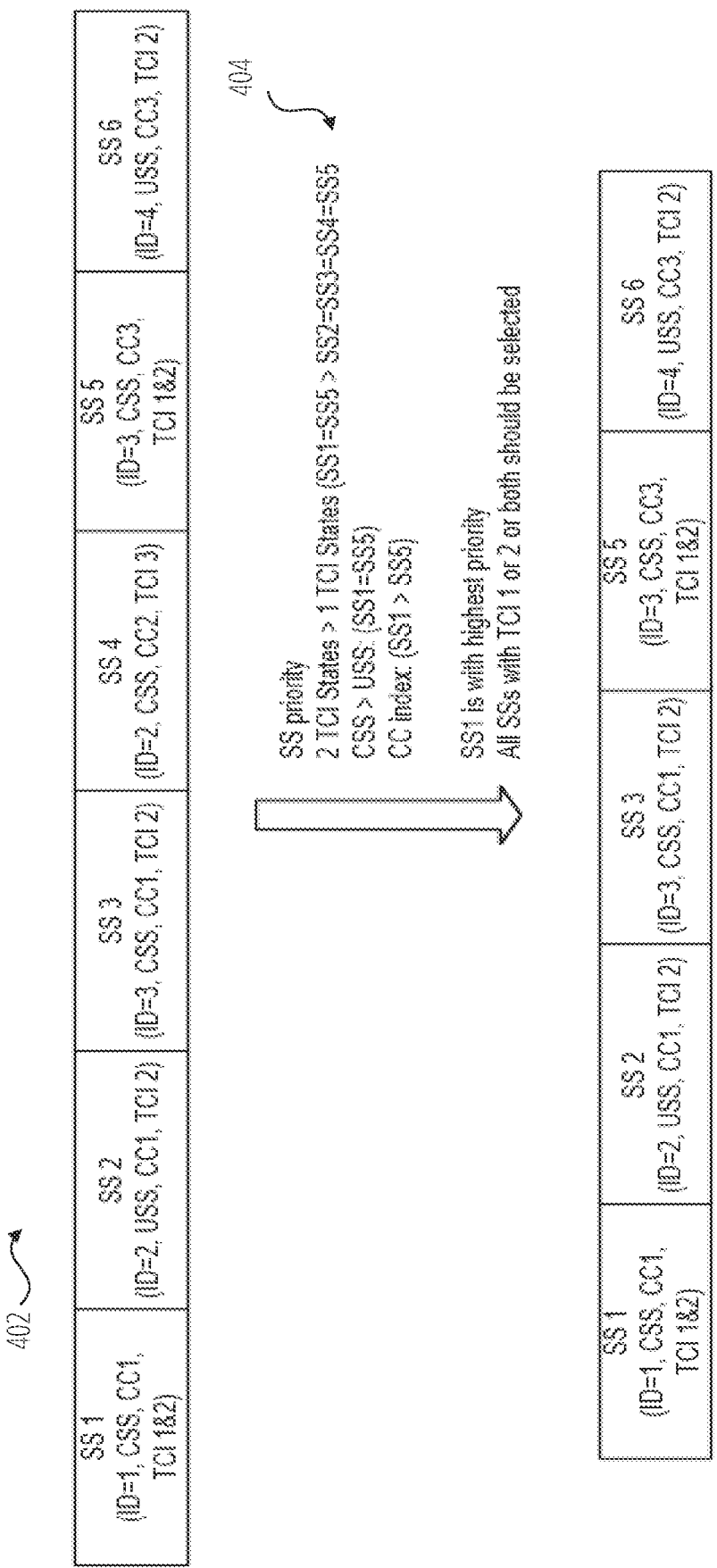
FIG. 4 illustrates an example of a case 5 collision being handled according to a second option in accordance with one embodiment.

As a second option, the priority can be determined by SS type, SS index, CC index as well as number of TCI States in a CORESET. For example, two TCI States CORESET may have a higher or lower priority compared to one TCI State CORESET. FIG. 4 illustrates an example of a case 5 collision being handled by a UE using this second option. As shown, the colliding signals SSs 402 are filtered using the priority rules 404. In this example, two TCI states have a greater priority than 1 TCI state so SS1 and SS5 are prioritized. Further prioritization involves CSS being greater than USS. However, in this case both SST and SS5 include CSS. Finally, prioritization also involves the CC index. Accordingly, SS1 is prioritized over SS5. As SS1 is found to have the highest priority, all SSs with TC1 or 2 or both should be selected by the UE.

Figure 5:
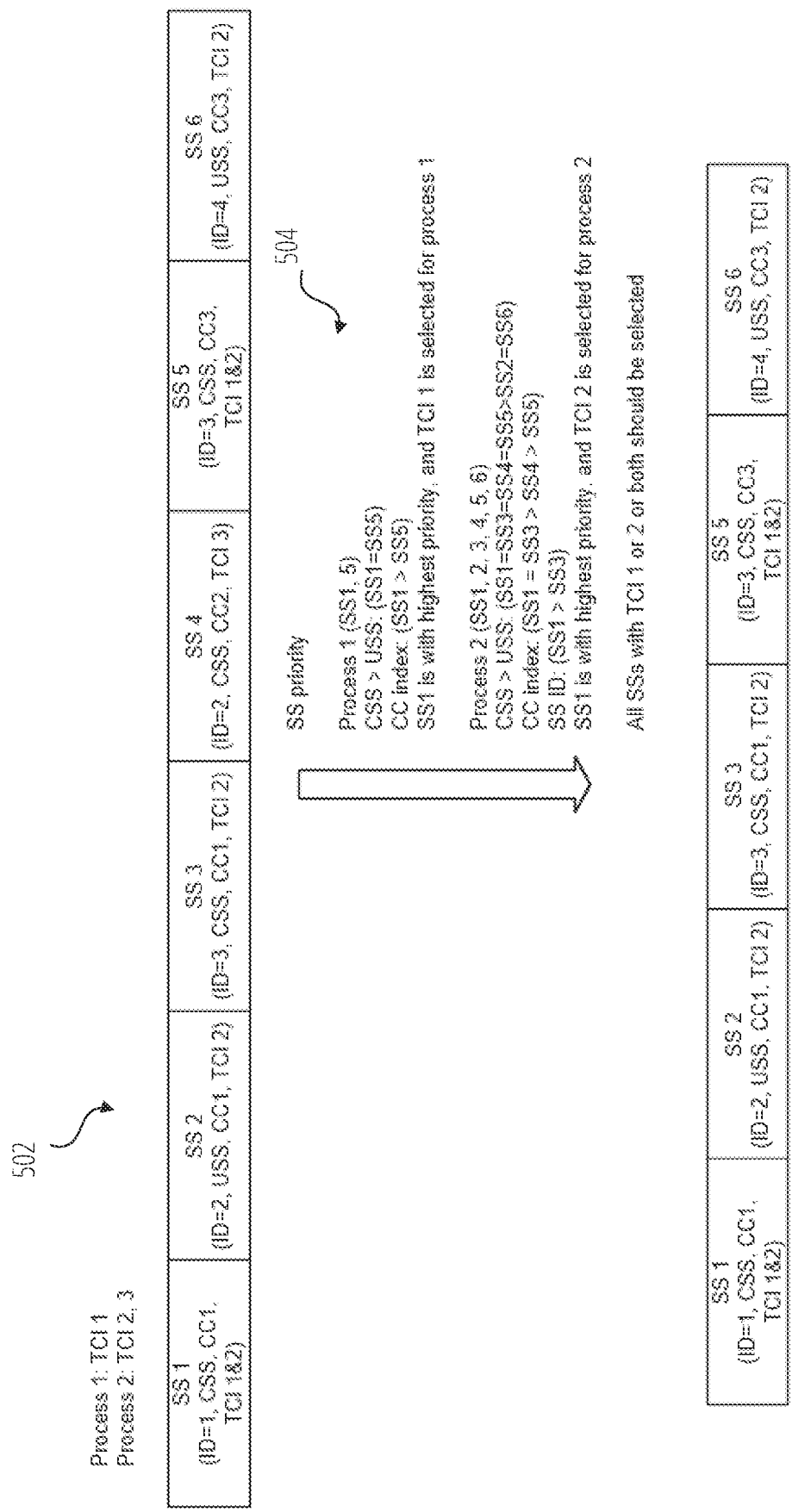
FIG. 5 illustrates an example of a case 5 collision being handled according to a third option in accordance with one embodiment.

As a third option, a process ID can be configured or associated with a ICI State or reported by UE for a DL RS configured in TCI State. In some embodiments, a legacy priority rule can be applied in SS or CORESET level for TCI State with the same process ID. Additionally, if there are N process Ms, UE may select N SSs. FIG. 5 illustrates an example of a case 5 collision being handled by a UE using this third option. As shown, a UE may use priority rules 504 to determine which colliding signal SS 502 to select. In the illustrated embodiment, two processes find that SST has the highest priority. Accordingly, all SSs with TCI 1 or 2 or both should be selected. The selected SSs include SS1, SS2, SS3, SS5, and SS6.

Figure 6:
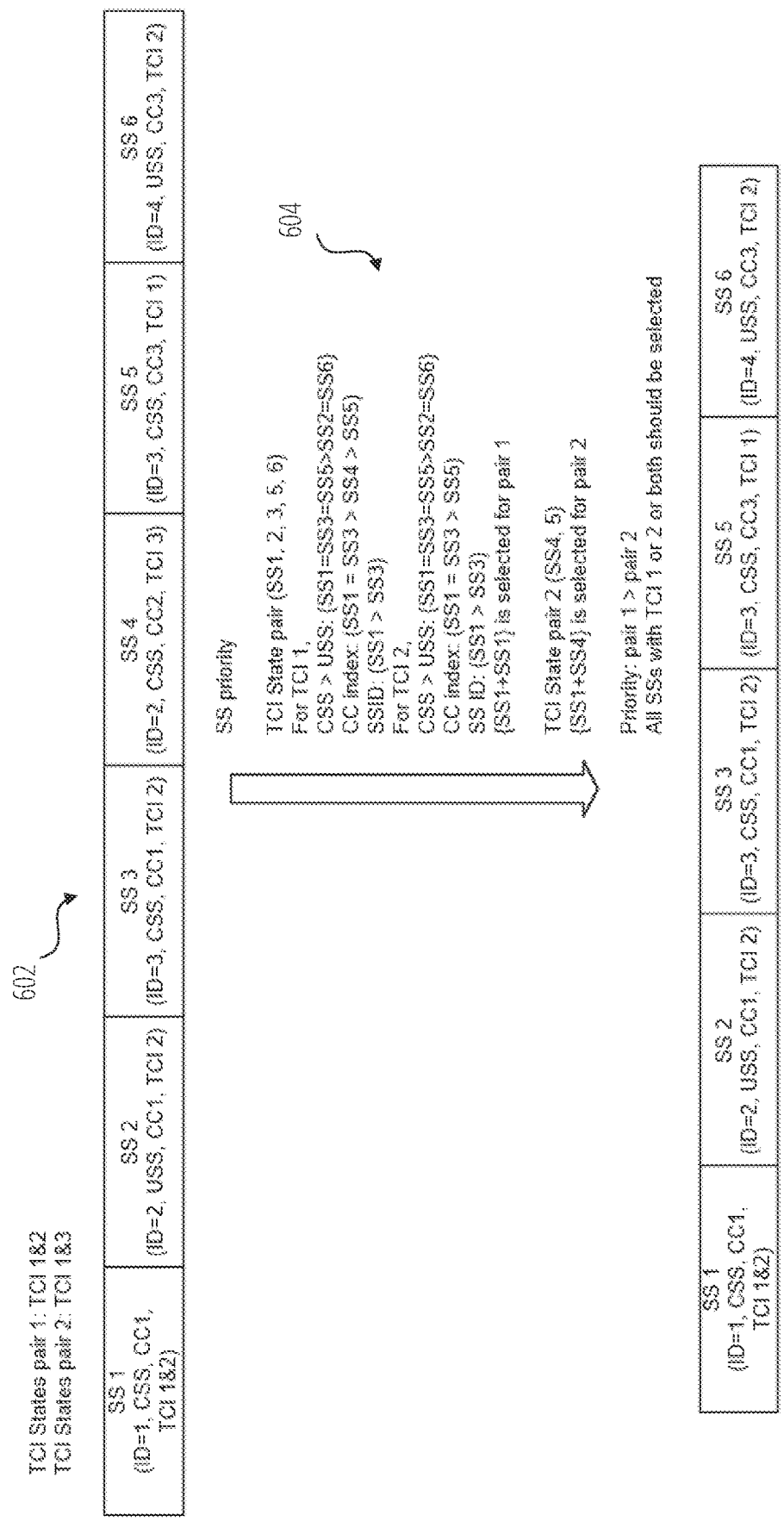
FIG. 6 illustrates an example of a case 5 collision being handled according to a fourth option in accordance with one embodiment.

As a fourth option, the priority can be determined per TCI States pair. The UE can report a pair of DL RSs that can be received simultaneously. In some embodiments, the legacy priority can be applied per TCI States pair. The SS corresponding to the ICI States pair with lowest or highest priority can be used to determine the priority per TCI States pair. FIG. 6 illustrates an example of a case 5 collision being handled by a UE using this fourth option. As shown, a UE may use priority rules 604 to determine which colliding signal SS 602 to select. In the illustrated embodiment, the TCI States pair with the highest priority is used to determine the priority.

As a fifth option, case 5 when PDCCH based on scheme 1 collides with PDCCH based on scheme 1 may be considered as an error case.

In some embodiments, for the first option and the second option of this scenario, if the CORESETs with two TCI States are selected, all the other normal PDCCH QCLed with one of the 2 TCI States can be selected. Further, an RRC parameter may be introduced to enable the new PDCCH+PDCCH collision handling rule. The LIE may report whether it supports this new rule.

Case 5 when PDCCH Based on Scheme 2 Collides with PDCCH Based on Scheme 2

FIGS. 7-10 illustrate options that may be used to handle case 5 when PDCCH based on scheme 2 collides with PDCCH based on scheme 2 and potentially other normal PDCCH.

Figure 7:
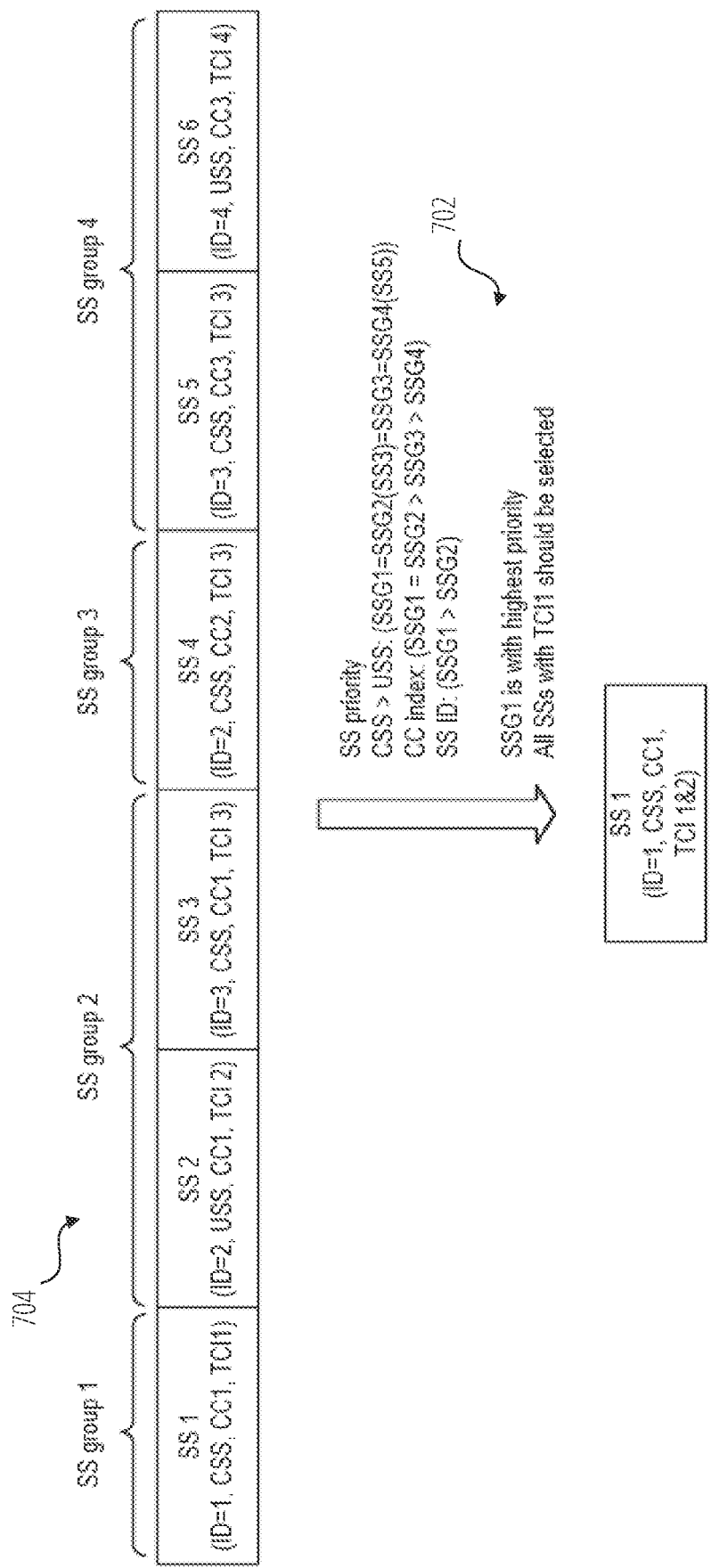
FIG. 7 illustrates a first option for handling case 5 when PDCCH based on scheme 2 collides with PDCCH based on scheme 2 and potentially other normal PDCCH, in accordance with one embodiment.

FIG. 7 illustrates a first option for handling case 5 when PDCCH based on scheme 2 collides with PDCCH based on scheme 2 and potentially other normal PDCCH. In this first option, a legacy priority rule 702 can be applied in SSs/CORESETs group level to select the SS/CORESET or SS/CORESET group with higher priority to determine which of the SSs 704 should be selected. In some embodiments, the priority can be based on the lowest priority SS in the group. In some embodiments, the priority can be based on the highest priority SS in the group. In some embodiments, a normal SS can be considered as a SS group.

Figure 8:
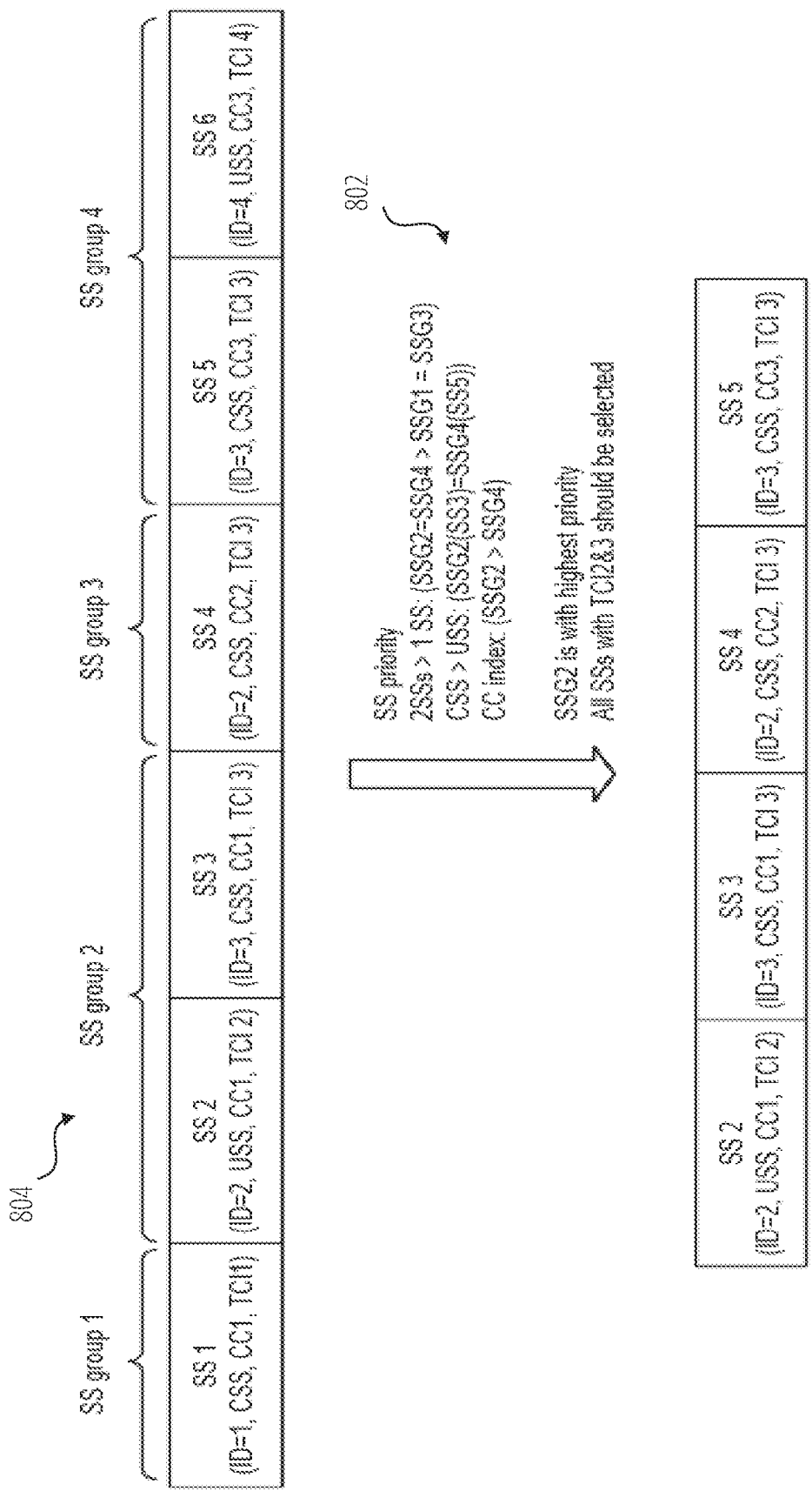
FIG. 8 illustrates a second option for handling case 5 when PDCCH based on scheme 2 collides with PDCCH based on scheme 2 and potentially other normal PDCCH in accordance with one embodiment.

FIG. 8 illustrates a second option for handling case 5 when PDCCH based on scheme 2 collides with PDCCH based on scheme 2 and potentially other normal PDCCH. In this second option, the priority can be determined by SS type, SS index, CC index, number of SSs in a SS group. For example, two SSs in a SS group may have a higher or lower priority compared to one SSs. As shown, a priority rule 802 may be applied to determine which of the SSs 804 should be selected. In the illustrated example, SS2, SS3, SS4, and SS5 are selected.

Figure 9:
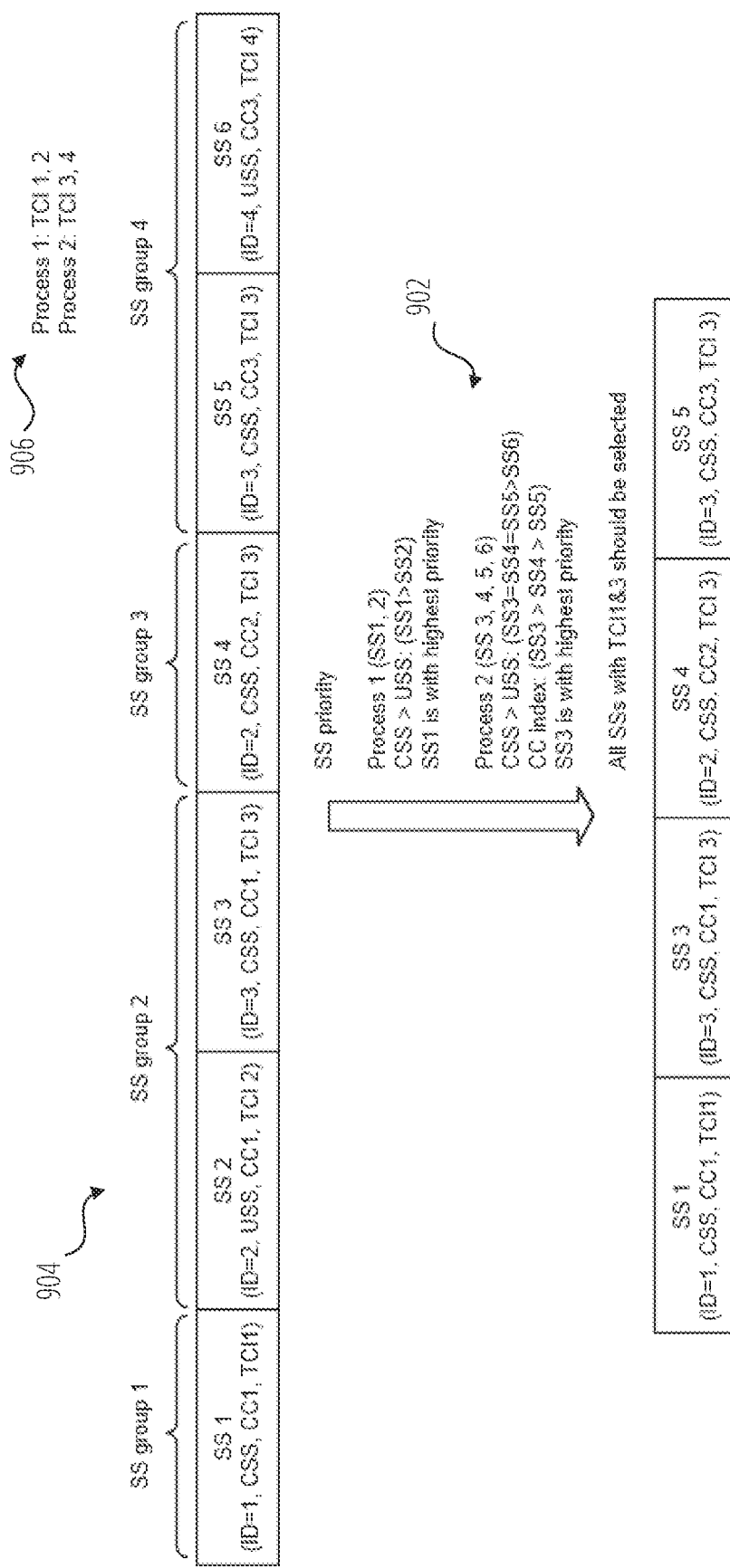
FIG. 9 illustrates a third option for handling case 5 when PDCCH based on scheme 2 collides with PDCCH based on scheme 2 and potentially other normal PDCCH in accordance with one embodiment.

FIG. 9 illustrates a third option for handling case 5 when PDCCH based on scheme 2 collides with PDCCH based on scheme 2 and potentially other normal PDCCH. In this third option, a process ID 906 can be configured or associated with a TCI State or reported by UE for a DL RS configured in TCI State, A legacy priority rule can be applied in SS/CORESET level for TCI State with the same process ID. Additionally, if there are N process IDs, UE can select N SSs. As shown, a priority rule 902 may be applied to determine which of the SSs 904 should be selected.

Figure 10:
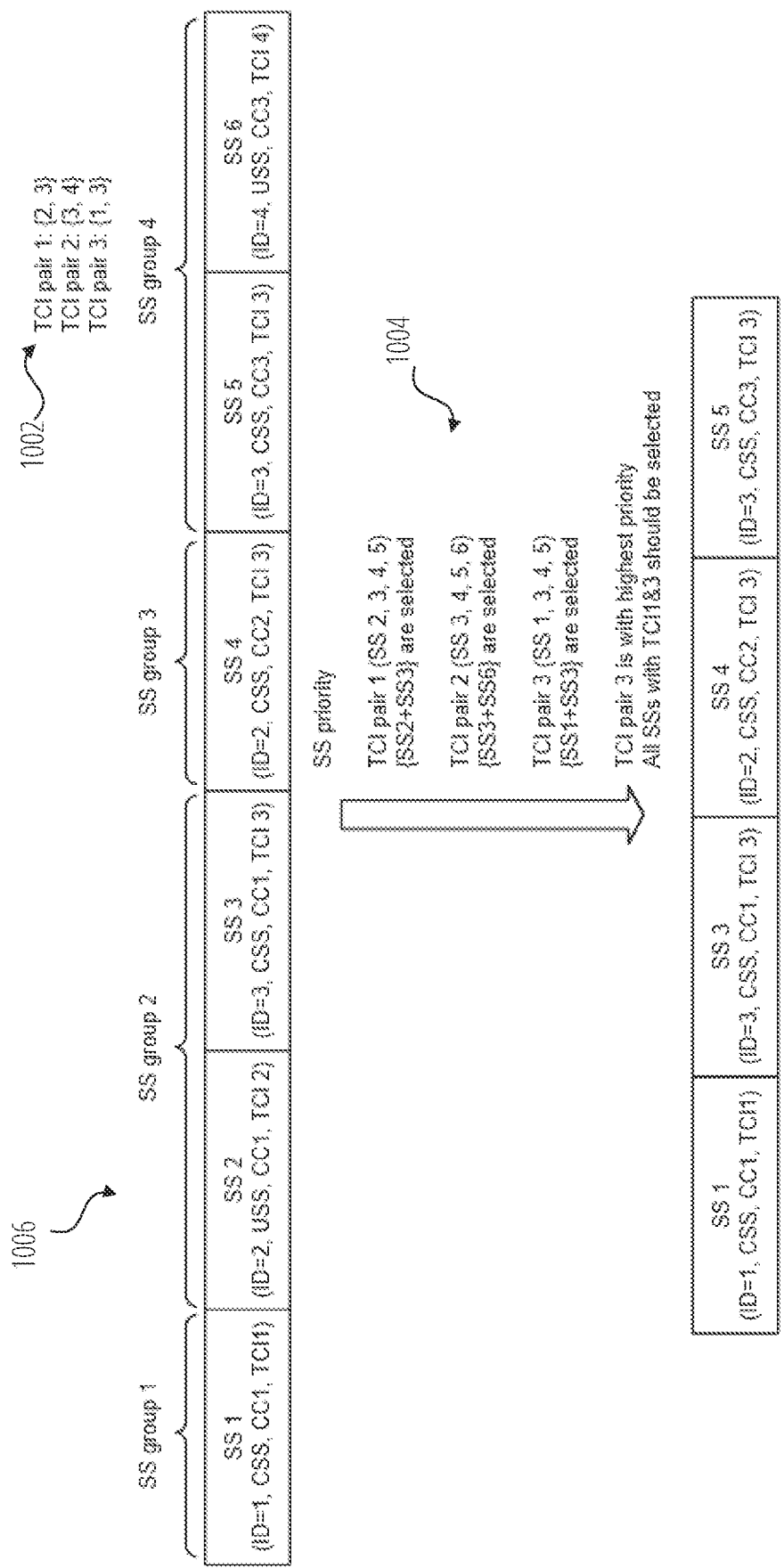
FIG. 10 illustrates a fourth option for handling case 5 when PDCCH based on scheme 2 collides with PDCCH based on scheme 2 and potentially other normal PDCCH in accordance with one embodiment.

FIG. 10 illustrates a fourth option for handling case 5 when PDCCH based on scheme 2 collides with PDCCH based on scheme 2 and potentially other normal PDCCH. In this fourth option, the priority can be determined per TCI States pair 1002, A UE can report a pair of DL RSs that can be received simultaneously. The legacy priority can be applied per TCI States pair 1002. The SS or SS group corresponding to the TCI States pair 1002 with lowest or highest priority can be used to determine the priority per TCI States pair. For example, as shown, a priority rule 1004 may be applied to determine which of the SSs 1006 should be selected based on priority determined per TCI States pair 1002.

A fifth option for handling case 5 when PDCCH based on scheme 2 collides with PDCCH based on scheme 2 and potentially other normal PDCCH may be to consider this as an error case.

In some embodiments, for the first option and the second option of this scenario, if two SSs are selected, all the other normal PDCCH QCLed with one of the 2 TCI States can be selected.

Case 5 when PDCCH Based on Scheme 1 Collides with PDCCH Based on Scheme

The following options may be used to handle case 5 when PDCCH based on scheme 1 collides with PDCCH based on scheme 2 and potentially other normal PDCCH. As first option, a legacy priority rule can be used to select the SS/CORESET or SS/CORESET group with higher priority. For SSs within a group, the priority can be determined per SSs group. In some embodiments, the priority can be based on the lowest priority SS in the group. In some embodiments, the priority can be based on the highest priority SS in the group.

As a second option, the priority can be determined by SS type, SS index, CC index, number of SSs in a SS group, number of TCI States per CORESET. For example, two SSs in a SS group may have a higher or lower priority compared to one SSs. Further, two TCI States CORESET may have a higher or lower priority compared to 2 SSs in a SS group.

As a third option, a process ID can be configured or associated with a TCI State or reported by UE for a DL RS configured in TCI State. In some embodiments, a legacy priority rule can be applied in SS/CORESET level for TCI State with the same process ID. If there are N process IDs, UE can select N SSs.

As a fourth option, the priority can be determined per TCI States pair. For example, a UE can report a pair of DL RSs that can be received simultaneously. In some embodiments, the legacy priority can be applied per TCI States pair. The SS corresponding to the TCI States pair with lowest or highest priority may be used to determine the priority per TCI States pair.

As a fifth option, this scenario may be considered as an error case. For example, both scheme 1 and scheme 2 may not be enabled simultaneously for a band.

In some embodiments, for the first option and second option of this scenario, if 2 SSs or CORESETs with 2 TCI States are selected, all the other normal PDCCH QCLed with one of the 2 TCI States can be selected. In some embodiments, for option 1 and option 2, if the CORESETs with 2 TCI States are selected, all the other normal PDCCH QCLed with one of the 2 TCI States can be selected.

Figure 11:
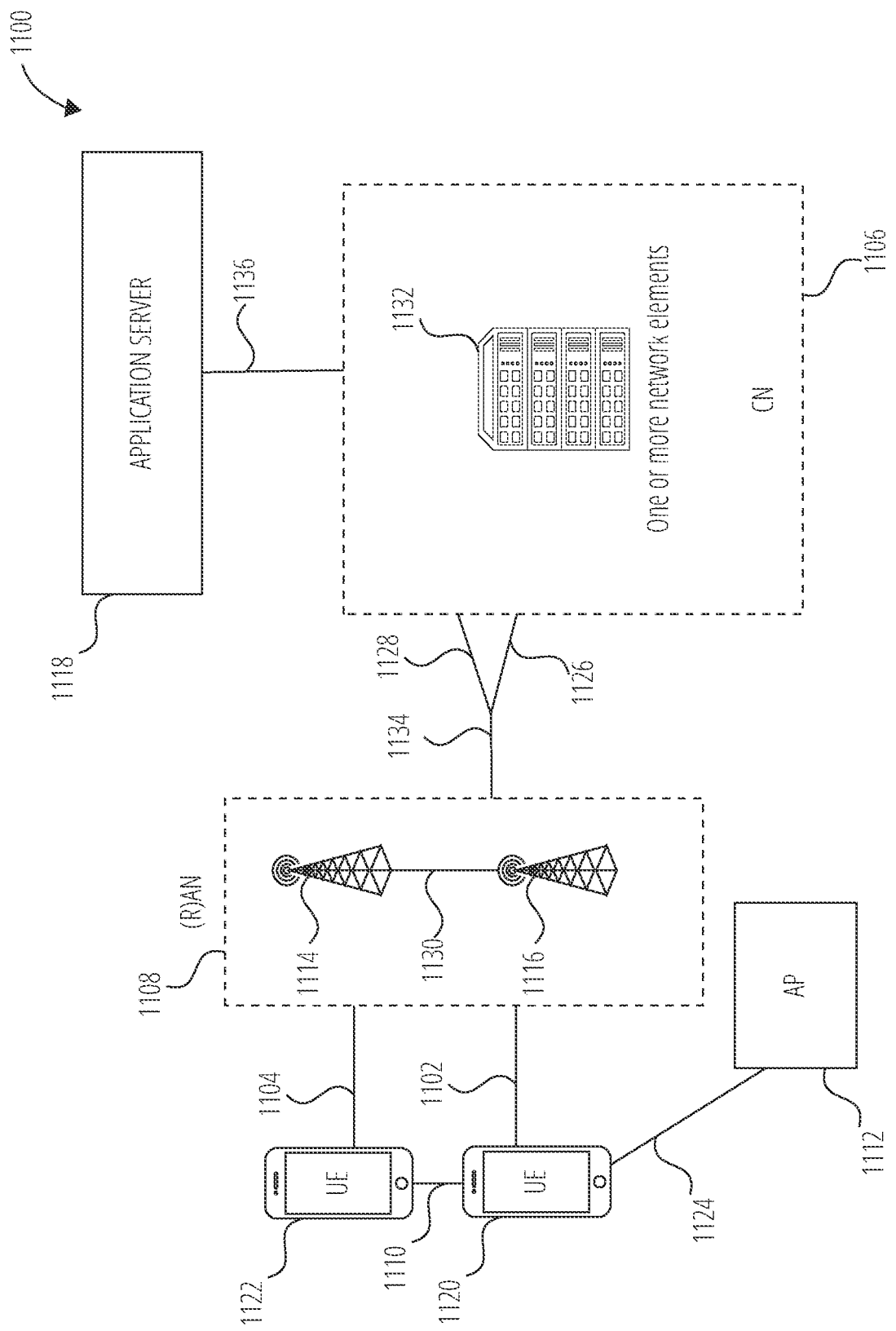
FIG. 11 illustrates a system in accordance with one embodiment.

FIG. 11 illustrates an example architecture of a system 1100 of a network, in accordance with various embodiments. The following description is provided for an example system 1100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., NYMAN, WiMAX, etc.), or the like.

As shown by FIG. 11, the system 1100 includes UE 1122 and UE 1120. In this example, the UE 1122 and the UE 1120 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 1122 and/or the UE 1120 may be IoT UEs, which may comprise a network access layer designed for low power IoT applications utilizing short-lived UE connections. An IoT UE can utilize technologies such as M2M or MTC for exchanging data with an MTC server or device via a PLMIN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The LIE 1122 and UE 1120 may be configured to connect, for example, communicatively couple, with an access node or radio access node (shown as (R)AN 1108). In embodiments, the (R)AN 1108 may be an NG RAN or a SG RAN, an E-UTRAN, or a legacy RAN, such as a UTRAN or GERAN. As used herein, the term "NG RAN" or the like may refer to a (R)AN 1108 that operates in an NR or SG system, and the term "E-UTRAN" or the like may refer to a (R)AN 1108 that operates in an LTE or 4G system. The UE 1122 and UE 1120 utilize connections (or channels) (shown as connection 1104 and connection 1102, respectively), each of which comprises a physical communications interface or layer (discussed in further detail below).

In this example, the connection 1104 and connection 1102 are air interfaces to enable communicative coupling, and can be consistent with cellular communications protocols, such as a GSM protocol, a CDMA network protocol, a PTT protocol, a POC protocol, a UNITS protocol, a 3GPP LTE protocol, a SG protocol, a NR protocol, and/or any of the other communications protocols discussed herein. In embodiments, the UE 1122 and UE 1120 may directly exchange communication data via a ProSe interface 1110. The ProSe interface 1110 may alternatively be referred to as a sidelink (SL) interface 110 and may comprise one or more logical channels, including but not limited to a PSCCH, a PSSCH, a PSDCH, and a PSBCH.

The UE 1120 is shown to be configured to access an AP 1112 (also referred to as "WLAN node," "WLAN," "WLAN Termination," "WT" or the like) via connection 1124. The connection 1124 can comprise a local wireless connection, such as a connection consistent with any IEEE 802.11 protocol, wherein the AP 1112 would comprise a wireless fidelity (Wi-Fi®) router. In this example, the AP 1112 may be connected to the Internet without connecting to the core network of the wireless system (described in further detail below). In various embodiments, the UE 1120, (R)AN 1108, and AP 1112 may be configured to utilize LWA operation and/or LWIP operation. The LWA operation may involve the UE 1120 in RRC_CONNECTED being configured by the RAN node 1114 or the RAN node 1116 to utilize radio resources of LTE and WLAN. LWIP operation may involve the UE 1120 using WLAN radio resources (e.g., connection 1124) via IPsec protocol tunneling to authenticate and encrypt packets (e.g., IP packets) sent over the connection 1124. IPsec tunneling may include encapsulating the entirety of original IP packets and adding a new packet header, thereby protecting the original header of the IP packets.

The (R)AN 1108 can include one or more AN nodes, such as RAN node 1114 and RAN node 1116, that enable the connection 1104 and connection 1102. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPS, and so forth, and can comprise ground stations (e.g., terrestrial access points) or satellite stations providing coverage within a geographic area (e.g., a cell). As used herein, the term "NG RAN node" or the like may refer to a RAN node that operates in an NR or 5G system (for example, a gNB), and the term "E-UTRAN node" or the like may refer to a RAN node that operates in an LTE or 4G system 1100 (e.g., an eNB). According to various embodiments, the RAN node 1114 or RAN node 1116 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 1114 or RAN node 1116 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 1114 or RAN node 1116); a MAC/PHY split wherein RRC, PDCP, RLC, and MAC layers are operated by, the CRAN/vBBUP and the PHY layer is operated by individual RAN nodes (e.g., RAN node 1114 or RAN node 1116); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 1114 or RAN node 1116 to perform other virtualized applications. In some implementations, an individual RAN node may represent individual gNB-DUs that are connected to a gNB-CU via individual F1 interfaces (not shown by FIG. 11). In these implementations, the gNB-DUs may include one or more remote radio heads or RFEMs, and the gNB-CU may be operated by a server that is located in the (R)AN 1108 (not shown) or by a server pool in a similar manner as the CRAN/vBBUP, Additionally, or alternatively, one or more of the RAN node 1114 or RAN node 1116 may be next generation eNBs (ng-eNBs), which are RAN nodes that provide E-UTRA user plane and control plane protocol terminations toward the UE 1122 and UE 1120, and are connected to an SGC via an NG interface (discussed infra). In V2X scenarios one or more of the RAN node 1114 or RAN node 1116 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 1114 and/or the RAN node 1116 can terminate the air interface protocol and can be the first point of contact for the UE 1122 and UE 1120. In some embodiments, the RAN node 1114 and/or the RAN node 1116 can fulfill various logical functions for the (R)AN 1108 including, but not limited to, radio network controller (RNC) functions such as radio bearer management, uplink and downlink dynamic radio resource management and data packet scheduling, and mobility management.

In embodiments, the UE 1122 and UE 1120 can be configured to communicate using OFDM communication signals with each other or with the RAN node 1114 and/or the RAN node 1116 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 1114 and/or the RAN node 1116 to the UE 1122 and UE 1120, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 1122 and UE 1120 and the RAN node 1114 and/or the RAN node 1116 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 1122 and UE 1120 and the RAN node 1114 or RAN node 1116 may operate using LAA, eLAA, and/or feLAA mechanisms. In these implementations, the LIE 1122 and UE 1120 and the RAN node 1114 or RAN node 1116 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 1122 and UE 1120, RAN node 1114 or RAN node 1116, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 1122, AP 1112, or the like) intends to transmit, the WIAN node may first perform CCA before transmission. Additionally, a hackoff mechanism is used to avoid collisions in situations where more than one WEAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WEAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 1122 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 1122 and UE 1120. The PDCCH carries information about the transport format and resource allocations related to the PDCCH channel, among other things. It may also inform the UE 1122 and UE 1120 about the transport format, resource allocation, and HARQ information related to the uplink shared channel. Typically, downlink scheduling (assigning control and shared channel resource blocks to the UE 1120 within a cell) may be performed at any of the RAN node 1114 or RAN node 1116 based on channel quality information fed back from any of the UE 1122 and UE 1120. The downlink resource assignment information may be sent on the PDCCH used for (e.g., assigned to) each of the UE 1122 and UE 1120.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition.

There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. ECCE may have other numbers of EREGs in some situations.

The RAN node 1114 or RAN node 1116 may be configured to communicate with one another via interface 1130. In embodiments where the system 1100 is an LTE system (e.g., when CN 1106 is an EPC), the interface 1130 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 1122 from an SeNB tier user data; information of PDCP PDUs that were not delivered to a UE 1122; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 1100 is a SG or NR system (e.g., when CN 1106 is an SGC), the interface 1130 may be an Xn interface. The Xn interface is defined between two or more RAN nodes (e.g., two or more gNBs and the like) that connect to SGC, between a RAN node 1114 (e.g., a gNB) connecting to SGC and an eNB, and/or between two eNBs connecting to 5GC (e.g., CN 1106). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1122 in a connected mode (e.g., CM-CONNFCTED) including functionality to manage the UE mobility for connected mode between one or more RAN node 1114 or RAN node 1116. The mobility support may include context transfer from an old (source) serving RAN node 1114 to new (target) serving RAN node 1116; and control of user plane tunnels between old (source) serving RAN node 1114 to new (target) serving RAN node 1116. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP lay er, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 1108 is shown to be communicatively coupled to a core network-in this embodiment, CN 1106. The CN 1106 may comprise one or more network elements 1132, which are configured to offer various data and telecommunications services to customers/subscribers (e.g., users of UE 1122 and UE 1120) who are connected to the CN 1106 via the (R)AN 1108. The components of the CN 1106 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 1106 may be referred to as a network slice, and a logical instantiation of a portion of the CN 1106 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 1118 may be an element offering applications that use IP bearer resources with the core network (e.g., UMTS PS domain, LTE PS data services, etc.). The application server 1118 can also be configured to support one or more communication services (e.g., VoIP sessions. PTT sessions, group communication sessions, social networking services, etc) for the UE 1122 and UE 1120 via the EPC. The application server 1118 may communicate with the CN 1106 through an IP communications interface 1136.

In embodiments, the CN 1106 may be an SGC, and the (R)AN 116 may be connected with the CN 1106 via an NG interface 1134. In embodiments, the NG interface 1134 may be split into two parts, an NG user plane (NG-U) interface 1126, which carries traffic data between the RAN node 1114 or RAN node 1116 and a UPF, and the S1 control plane (NG-C) interface 1128, which is a signaling interface between the RAN node 1114 or RAN node 1116 and AMFs.

In embodiments, the CN 1106 may be a SG CN, while in other embodiments, the CN 1106 may be an EPC). Where CN 1106 is an EPC, the (R)AN 116 may be connected with the CN 1106 via an S1 interface 1134. In embodiments, the S1 interface 1134 may be split into two parts, an S1 user plane (S1-U) interface 1126, which carries traffic data between the RAN node 1114 or RAN node 1116 and the S-GW, and the S1-MME interface 1128, which is a signaling interface between the RAN node 1114 or RAN node 1116 and MMES.

Figure 12:
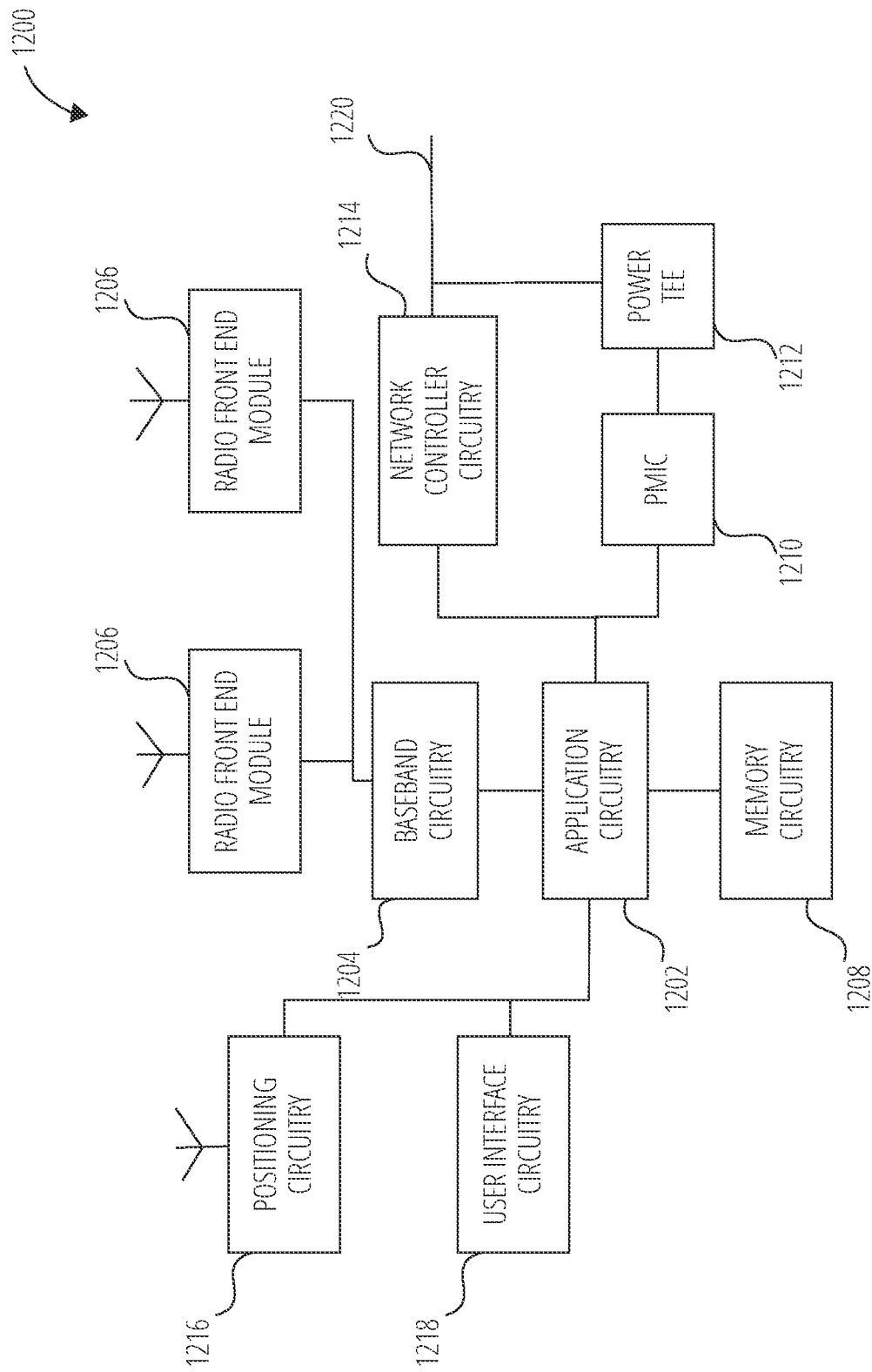
FIG. 12 illustrates an infrastructure equipment in accordance with one embodiment.

FIG. 12 illustrates an example of infrastructure equipment 1200 in accordance with various embodiments. The infrastructure equipment 1200 may be implemented as a base station, radio head, RAN node, AN, application server, and/or any other element/device discussed herein. In other examples, the infrastructure equipment 1200 could be implemented in or by a UE.

The infrastructure equipment 1200 includes application circuitry 1202, baseband circuitry 1204, one or more radio front end module 1206 (RFEM), memory circuitry 1208, power management integrated circuitry (shown as PMIC 1210), power tee circuitry 1212, network controller circuitry 1214, network interface connector 1220, satellite positioning circuitry 1216, and user interface circuitry 1218. In some embodiments, the device infrastructure equipment 1200 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 1202 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1202 may be coupled with or may include memory/storage elements and may be configured to execute instructions stored in the memory/storage to enable various applications or operating systems to run on the infrastructure equipment 1200. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1202 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1202 may comprise, or may be, a special-purpose processor/controller to operate according to the various embodiments herein. As examples, the processor(s) of application circuitry 1202 may include one or more Intel Pentium®, Core®, or Xeon® processor(s); Advanced Micro Devices (AMD) Ryzen® processor(s), Accelerated Processing Units (APU's), or Epyc® processors; ARM-based processor(s) licensed from ARM Holdings, Ltd. such as the ARM Cortex-A family of processors and the ThunderX2®, provided by Cavium™, Inc.; a MIPS-based design from MIPS Technologies, Inc. such as MIPS Warrior P-class processors; and/or the like. In some embodiments, the infrastructure equipment 1200 may not utilize application circuitry 1202, and instead may include a special-purpose processor/controller to process IP data received from an EPC or 5GC, for example.

In some implementations, the application circuitry 1202 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1202 may comprise logic blocks or logic fabric, and other interconnected resources that may be programmed to perform various functions, such as the procedures, methods, functions, etc. of the various embodiments discussed herein. In such embodiments, the circuitry of application circuitry 1202 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like. The baseband circuitry 1204 may be implemented, for example, as a solder-down substrate including one or more integrated circuits, a single packaged integrated circuit soldered to a main circuit board or a multi-chip module containing two or more integrated circuits.

The user interface circuitry 1218 may include one or more user interfaces designed to enable user interaction with the infrastructure equipment 1200 or peripheral component interfaces designed to enable peripheral component interaction with the infrastructure equipment 1200. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 1206 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both minWave and sub-mmWave radio functions may be implemented in the same physical radio front end module 1206, which incorporates both mmWave antennas and sub-mmWave.

The memory circuitry 1208 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. The memory circuitry 1208 may be implemented as one or more of solder down packaged integrated circuits, socketed memory modules and plug-in memory cards.

The PMIC 1210 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1212 may provide for electrical power drawn from a network cable to provide both power supply and data connectivity to the infrastructure equipment 1200 using a single cable.

The network controller circuitry 1214 may provide connectivity to a network using a standard network interface protocol such as Ethernet, Ethernet over GRE Tunnels, Ethernet over Muitiprotocol Label Switching (MPLS), or some other suitable protocol. Network connectivity may be provided to/from the infrastructure equipment 1200 via network interface connector 1220 using a physical connection, which may be electrical (commonly referred to as a "copper interconnect"), optical, or wireless. The network controller circuitry 1214 may include one or more dedicated processors and/or FPGAs to communicate using one or more of the aforementioned protocols. In some implementations, the network controller circuitry 1214 may include multiple controllers to provide connectivity to other networks using the same or different protocols.

The positioning circuitry 1216 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radiopositioning Integrated by Satellite (DORIS), etc.), or the like. The positioning circuitry 1216 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1216 may include a Micro-Technology for Positioning, Navigation, and Timing (Micro-PNT) IC that uses a master timing clock to perform position tracking/estimation without GLASS assistance. The positioning circuitry 1216 may also be part of, or interact with, the baseband circuitry 1204 and/or radio front end module 1206 to communicate with the nodes and components of the positioning network. The positioning circuitry 1216 may also provide position data and/or time data to the application circuitry 1202, which may use the data to synchronize operations with various infrastructure, or the like. The components shown by FIG. 12 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCie), or any number of other technologies. The bus/IX may be a proprietary bus, for example, used in a SoC based system. Other bus/IX systems may be included, such as an I²C interface, an SPI interface, point to point interfaces, and a power bus, among others.

Figure 13:
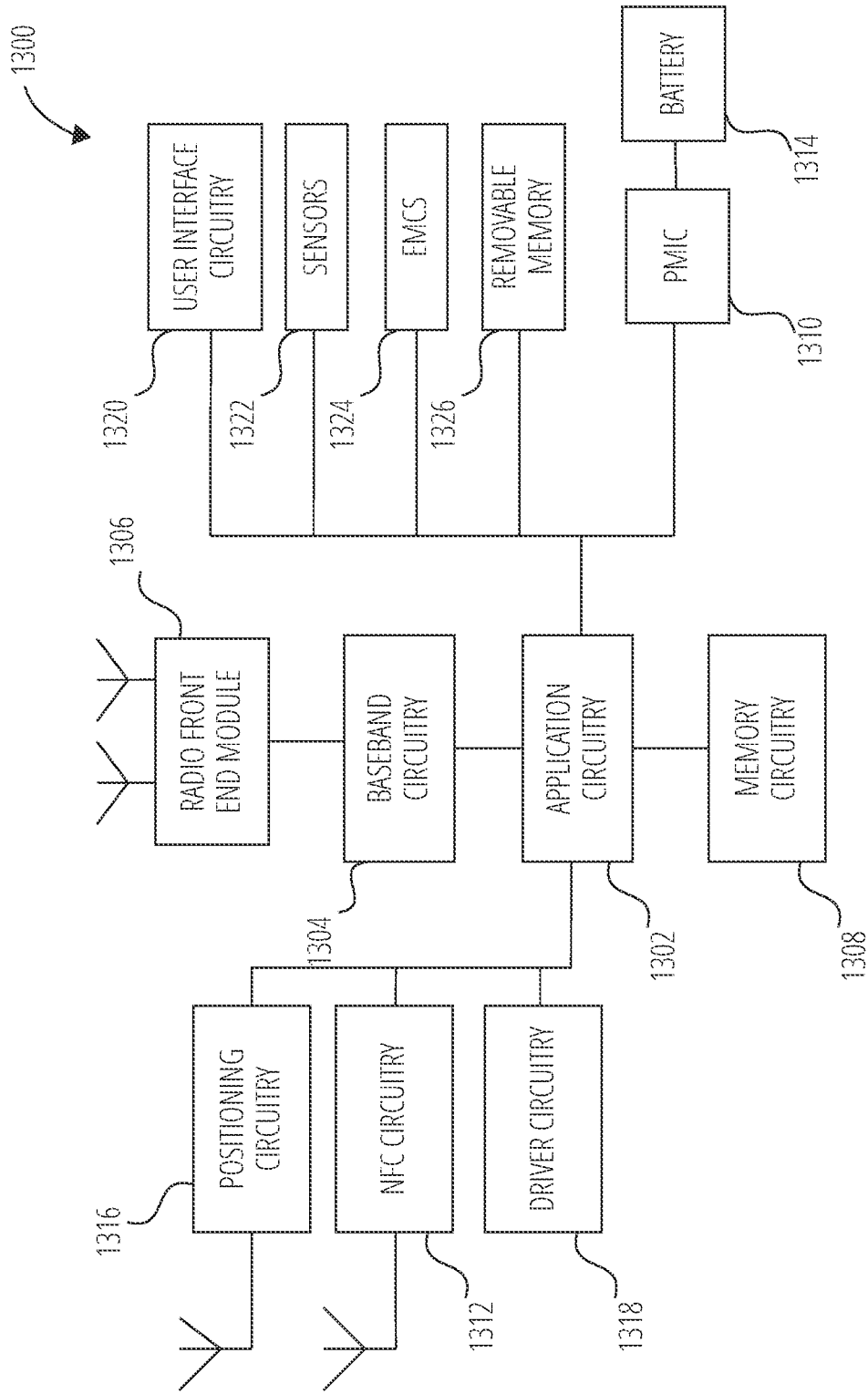
FIG. 13 illustrates a platform in accordance with one embodiment.

FIG. 13 illustrates an example of a platform 1300 in accordance with various embodiments. In embodiments, the computer platform 1300 may be suitable for use as UEs, application servers, and/or any other element/device discussed herein. The platform 1300 may include any combinations of the components shown in the example. The components of platform 1300 may be implemented as integrated circuits (ICs), portions thereof, discrete electronic devices, or oilier modules, logic, hardware, software, firmware, or a combination thereof adapted in the computer platform 1300, or as components otherwise incorporated within a chassis of a larger system. The block diagram of FIG. 13 is intended to show a high level view of components of the computer platform 1300. However, some of the components shown may be omitted, additional components may be present, and different arrangement of the components shown may occur in other implementations.

Application circuitry 1302 includes circuitry such as, but not limited to one or more processors processor cores), cache memory, and one or more of LDOs, interrupt controllers, serial interfaces such as SPI, I²C or universal programmable serial interface module, RTC, timer-counters including interval and watchdog timers, general purpose IQ memory card controllers such as SD MMC or similar, USB interfaces, MIPI interfaces, and JTAG test access ports. The processors (or cores) of the application circuitry 1302 may be coupled with or may include memory storage elements and may be configured to execute instructions stored in the memory/storage to enable various applications or operating systems to run on the platform 1300. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1302 may include, for example, one or more processor cores, one or more application processors, one or more GPUs, one or more RISC processors, one or more ARM processors, one or more CISC processors, one or more DSP, one or more FPGAs, one or more PhDs, one or more ASICs, one or more microprocessors or controllers, a multithreaded processor, an ultra-low voltage processor, an embedded processor, some other known processing element, or any suitable combination thereof. In some embodiments, the application circuitry 1302 may comprise, or may be, a special-purpose processor/controller to operate according to the various embodiments herein.

As examples, the processor(s) of application circuitry 1302 may include an Intel® Architecture Core™ based processor, such as a Quark™, an Atom™, an i3, an i5, an i7, or an MCU-class processor, or another such processor available from Intel® Corporation. The processors of the application circuitry 1302 may also be one or more of Advanced Micro Devices (AMD) Ryzen® processor(s) or Accelerated Processing Units (APUs); AS-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc, such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1302 may be a part of a system on a chip (SoC) in which the application circuitry 1302 and other components are formed into a single integrated circuit, or a single package, such as the Edison™ or Galileo™ SoC boards from Intel® Corporation.

Additionally or alternatively, application circuitry 1302 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1302 may comprise logic blocks or logic fabric, and other interconnected resources that may be programmed to perform various functions, such as the procedures, methods, functions, etc. of the various embodiments discussed herein. In such embodiments, the circuitry of application circuitry 1302 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1304 may be implemented, for example, as a solder-down substrate including one or more integrated circuits, a single packaged integrated circuit soldered to a main circuit board or a multi-chip module containing two or more integrated circuits.

The radio front end module 1306 may comprise a millimeter wave (mmWave) radio front end module (RFEM) and one or more sub-mmWave radio frequency integrated circuits (RFICs). In some implementations, the one or more sub-mmWave RFIC's may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1306, which incorporates both mmWave antennas and sub-mmWave.

The memory circuitry 1308 may include any number and type of memory devices used to provide for a given amount of system memory. As examples, the memory circuitry 1308 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 1308 may be developed in accordance with a Joint Electron Devices Engineering Council (JEDEC) low power double data rate (LPDDR)-based design, such as LPDDR2, LPDDR3, LPDDR4, or the like. Memory circuitry 1308 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1308 maybe on-die memory or registers associated with the application circuitry 1302. To provide for persistent storage of information such as data, applications, operating systems and so forth, memory circuitry 1308 may include one or more mass storage devices, which may include, inter ilia, a solid state disk drive (SSDD), hard disk drive (HDD), a microHDD, resistance change memories, phase change memories, holographic memories, or chemical memories, among others. For example, the computer platform 1300 may incorporate the three-dimensional (3D) cross-point (XPOINT) memories from Intel® and Micron®.

The removable memory 1326 may include devices, circuitry, enclosures/housings, ports or receptacles, etc. used to couple portable data storage devices with the platform 1300. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1300 may also include interface circuitry (not shown) that is used to connect external devices with the platform 1300. The external devices connected to the platform 1300 via the interface circuitry include sensors 1322 and electro-mechanical components (shown as EMCs 1324), as well as removable memory devices coupled to removable memory 1326.

The sensors 1322 include devices, modules, or subsystems whose purpose is to detect events or changes in its environment and send the information (sensor data) about the detected events to some other a device, module, subsystem, etc. Examples of such sensors include, inter alia, inertia measurement units (IMUS) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1324 include devices, modules, or subsystems whose purpose is to enable platform 1300 to change its state, position, and/or orientation, or move or control a mechanism or (sub)system. Additionally, EMCs 1324 may be configured to generate and send messages/signaling to other components of the platform 1300 to indicate a current state of the EMCs 1324. Examples of the EMCs 1324 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1300 is configured to operate one or more EMCs 1324 based on one or more captured events and/or instructions or control signals received from a service provider and/or various clients. In some implementations, the interface circuitry may connect the platform 1300 with positioning circuitry 1316. The positioning circuitry 1316 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc), or the like. The positioning circuitry 1316 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1316 may include a Micro-PNT IC that uses a master timing clock to perform position tracking/estimation without GNSS assistance. The positioning circuitry 1316 may also be part of, or interact with, the baseband circuitry 1304 and/or radio front end module 1306 to communicate with the nodes and components of the positioning network. The positioning circuitry 1316 may also provide position data and/or time data to the application circuitry 1302, which may use the data to synchronize operations with various infrastructure (e.g., radio base stations), for turn-by-turn navigation applications, or the like.

In some implementations, the interface circuitry may connect the platform 1300 with Near-Field Communication circuitry (shown as NFC circuitry 1312). The NFC circuitry 1312 is configured to provide contactless, short-range communications based on radio frequency identification (RFID) standards, wherein magnetic field induction is used to enable communication between NFC circuitry 1312 and NFC-enabled devices external to the platform 1300 (e.g., an "NFC touchpoint"). NFC circuitry 1312 comprises an NFC controller coupled with an antenna element and a processor coupled with the NFC controller. The NFC controller may be a chip/IC providing NFC functionalities to the NFC circuitry 1312 by executing NFC controller firmware and an NFC stack The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1312, or initiate data transfer between the NFC circuitry 1312 and another active NIT device (e.g., a smartphone or an NFC-enabled POS terminal) that is proximate to the platform 1300.

The driver circuitry 1318 may include software and hardware elements that operate to control particular devices that are embedded in the platform 1300, attaches) to the platform 1300, or otherwise communicatively coupled with the platform 1300. The driver circuitry 1318 may include individual drivers allowing other components of the platform 1300 to interact with or control various input/output (I/O) devices that may be present within, or connected to, the platform 1300. For example, driver circuitry 1318 may include a display driver to control and allow access to a display device, a touchscreen driver to control and allow access to a touchscreen interface of the platform 1300, sensor drivers to obtain sensor readings of sensors 1322 and control and allow access to sensors 1322, EMC drivers to obtain actuator positions of the EMCs 1324 and/or control and allow access to the EMCs 1324, a camera driver to control and allow access to an embedded image capture device, audio drivers to control and allow access to one or more audio devices.

The power management integrated circuitry (shown as PMIC 1310) (also referred to as "power management circuitry") may manage power provided to various components of the platform 1300. In particular, with respect to the baseband circuitry 1304, the PMIC 1310 may control power-source selection, voltage scaling, battery charging, or DC-to-DC conversion. The PMIC 1310 may often be included when the platform 1300 is capable of being powered by a battery 1314, for example, when the device is included in a UE.

In some embodiments, the PMIC 1310 may control, or otherwise be part of, various power saving mechanisms of the platform 1300. For example, if the platform 1300 is in an RRC_Connected state, where it is still connected to the RAN node as it expects to receive traffic shortly, then it may enter a state known as Discontinuous Reception Mode (DRX) after a period of inactivity. During this state, the platform 1300 may power down for brief intervals of time and thus save power. If there is no data traffic activity for an extended period of time, then the platform 1300 may transition off to an RRC_Idle state, where it disconnects from the network and does not perform operations such as channel quality feedback, handover, etc. The platform 1300 goes into a very low power state and it performs paging where again it periodically wakes up to listen to the network and then powers down again. The platform 1300 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1314 may power the platform 1300, although in some examples the platform 1300 may be mounted deployed in a fixed location, and may have a power supply coupled to an electrical grid. The battery 1314 may be a lithium ion battery, a metal-air battery, such as a zinc-air battery, an aluminum-air battery, a lithium-air battery, and the like. In some implementations, such as in V2X applications, the battery 1314 may be a typical lead-acid automotive battery.

In some implementations, the battery 1314 may be a "smart battery," which includes or is coupled with a Battery Management System (BMS) or battery monitoring integrated circuitry. The BMS may be included in the platform 1300 to track the state of charge (SoCh) of the battery 1314. The BMS may be used to monitor other parameters of the battery 1314 to provide failure predictions, such as the state of health (SoH) and the state of function (SoF) of the battery 1314. The BMS may communicate the information of the battery 1314 to the application circuitry 1302 or other components of the platform 1300. The BMS may also include an analog-to-digital (ADC) convertor that allows the application circuitry 1302 to directly monitor the voltage of the battery 1314 or the current flow from the battery 1314. The battery parameters may be used to determine actions that the platform 1300 may perform, such as transmission frequency, network operation, sensing frequency, and the like.

A power block, or other power supply coupled to an electrical grid may be coupled with the BMS to charge the battery 1314. In some examples, the power block may be replaced with a wireless power receiver to obtain the power wirelessly, for example, through a loop antenna in the computer platform 1300. In these examples, a wireless battery charging circuit may be included in the BMS. The specific charging circuits chosen may depend on the size of the battery 1314, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1320 includes various input/output (I/O) devices present within, or connected to, the platform 1300, and includes one or more user interfaces designed to enable user interaction with the platform 1300 and/or peripheral component interfaces designed to enable peripheral component interaction with the platform 1300. The user interface circuitry 1320 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1300. The output device circuitry may also include speakers or other audio emitting devices, printer(s), and/or the like. In some embodiments, the sensors 1322 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1300 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 14:
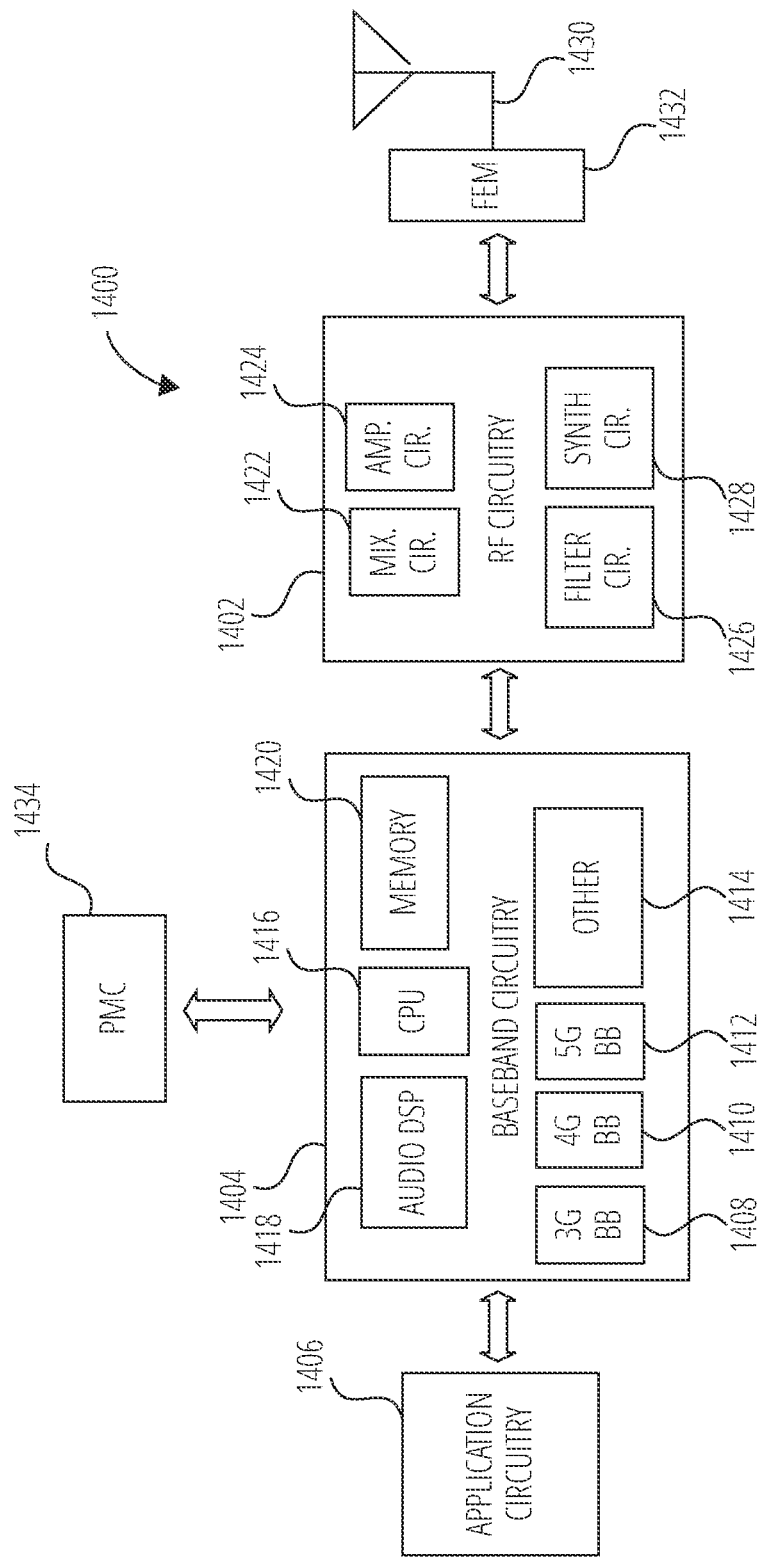
FIG. 14—illustrates a device in accordance with one embodiment.

FIG. 14 illustrates example components of a device 1400 in accordance with some embodiments. In some embodiments, the device 1400 may include application circuitry 1406, baseband circuitry 1404, Radio Frequency (RF) circuitry (shown as RF circuitry 1402), front-end module (FEM) circuitry (shown as FEM circuitry 1432), one or more antennas 1430, and power management circuitry (PMC) (shown as PMC 1434) coupled together at least as shown. The components of the illustrated device 1400 may be included in a UE or a RAN node. In some embodiments, the device 1400 may include fewer elements (e.g., a RAN node may not utilize application circuitry 1406, and instead include a processor/controller to process IP data received from an EPC). In some embodiments, the device 1400 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1406 may include one or more application processors. For example, the application circuitry 1406 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1400. In some embodiments, processors of application circuitry 1406 may process IP data packets received from an EPC.

The baseband circuitry 1404 may include circuitry such as, but not limited to, one or more single-core or multi-core processors. The baseband circuitry 1404 may include one or more baseband processors or control logic to process baseband signals received from a receive signal path of the RF circuitry 1402 and to generate baseband signals for a transmit signal path of the RF circuitry 1402. The baseband circuitry 1404 may interface with the application circuitry 1406 for generation and processing of the baseband signals and for controlling operations of the RF circuitry 1402. For example, in some embodiments, the baseband circuitry 1404 may include a third generation (3G) baseband processor (3G baseband processor 1408), a fourth generation (4G) baseband processor (4G baseband processor 1410), a fifth generation (5G) baseband processor (5G baseband processor 1412), or other baseband processor(s) 1414 for other existing generations, generations in development or to be developed in the future (e.g., second generation (2G), sixth generation (6G), etc.). The baseband circuitry 1404 (e.g., one or more of baseband processors) may handle various radio control functions that enable communication with one or more radio networks via the RF circuitry 1402. In other embodiments, some or all of the functionality of the illustrated baseband processors may be included in modules stored in the memory 1420 and executed via a Central Processing Unit (CPU 1416). The radio control functions may include, but are not limited to, signal modulation/demodulation, encoding/decoding, radio frequency shifting, etc. In some embodiments, modulation/demodulation circuitry of the baseband circuitry 1404 may include Fast-Fourier Transform (FFT), preceding, or constellation mapping/demapping functionality. In some embodiments, encoding/decoding circuitry of the baseband circuitry 1404 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1404 may include a digital signal processor (DSP), such as one or more audio DSP(s) 1418. The one or more audio DSP(s) 1418 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1404 and the application circuitry 1406 may be implemented together such as, for example, on a system on a chip (SOC).

In some embodiments, the baseband circuitry 1404 may provide for communication compatible with one or more radio technologies. For example, in some embodiments, the baseband circuitry 1404 may support communication with an evolved universal terrestrial radio access network (EUTRAN) or other wireless metropolitan area networks (WMAN), wireless local area network (WLAN), or a wireless personal area network (WPAN). Embodiments in which the baseband circuitry 1404 is configured to support radio communications of more than one wireless protocol may be referred to as multi-mode baseband circuitry.

The RF circuitry 1402 may enable communication with wireless networks using modulated electromagnetic radiation through a non-solid medium. In various embodiments, the RF circuitry 1402 may include switches, filters, amplifiers, etc. to facilitate the communication with the wireless network. The RF circuitry 1402 may include a receive signal path which may include circuitry to down-convert RF signals received from the FEM circuitry 1432 and provide baseband signals to the baseband circuitry 1404. The RF circuitry 1402 may also include a transmit signal path which may include circuitry to up-convert baseband signals provided by the baseband circuitry 1404 and provide RF output signals to the FEM circuitry 1432 for transmission.

In some embodiments, the receive signal path of the RF circuitry 1402 may include mixer circuitry 1422, amplifier circuitry 1424 and filter circuitry 1426. In some embodiments, the transmit signal path of the RF circuitry 1402 may include filter circuitry 1426 and mixer circuitry 1422. The RF circuitry 1402 may also include synthesizer circuitry 1428 for synthesizing a frequency for use by the mixer circuitry 1422 of the receive signal path and the transmit signal path. In some embodiments, the mixer circuitry 1422 of the receive signal path may be configured to down-convert RF signals received from the FEM circuitry 1432 based on the synthesized frequency provided by synthesizer circuitry 1428. The amplifier circuitry 1424 may be configured to amplify the down-converted signals and the filter circuitry 1426 may be a low-pass filter (LIT) or band-pass filter (BPF) configured to remove unwanted signals from the down-converted signals to generate output baseband signals. Output baseband signals may be provided to the baseband circuitry 1404 for further processing. In some embodiments, the output baseband signals may be zero-frequency baseband signals, although this is not a requirement. In some embodiments, the mixer circuitry 1422 of the receive signal path may comprise passive mixers, although the scope of the embodiments is not limited in this respect.

In some embodiments, the mixer circuitry 1422 of the transmit signal path may be configured to up-convert input baseband signals based on the synthesized frequency provided by the synthesizer circuitry 1428 to generate RF output signals for the FEM circuitry 1432. The baseband signals may be provided by the baseband circuitry 1404 and may be filtered by the filter circuitry 1426.

In some embodiments, the mixer circuitry 1422 of the receive signal path and the mixer circuitry 1422 of the transmit signal path may include two or more mixers and may be arranged for quadrature downconversion and upconversion, respectively. In some embodiments, the mixer circuitry 1422 of the receive signal path and the mixer circuitry 1422 of the transmit signal path may include two or more mixers and may be arranged for image rejection (e.g., Hartley image rejection). In some embodiments, the mixer circuitry 1422 of the receive signal path and the mixer circuitry 1422 may be arranged for direct downconversion and direct upconversion, respectively. In some embodiments, the mixer circuitry 1422 of the receive signal path and the mixer circuitry 1422 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1402 may include analog-to-digital converter (ADC) and digital-to-analog converter (DAC) circuitry and the baseband circuitry 1404 may include a digital baseband interface to communicate with the RF circuitry 1402.

In some dual-mode embodiments, a separate radio IC circuitry may be provided for processing signals for each spectrum, although the scope of the embodiments is not limited in this respect.

In some embodiments, the synthesizer circuitry 1428 may be a fractional-N synthesizer or a fractional N/N+1 synthesizer, although the scope of the embodiments is not limited in this respect as other types of frequency synthesizers may be suitable. For example, synthesizer circuitry 1428 may be a delta-sigma synthesizer, a frequency multiplier, or a synthesizer comprising a phase-locked loop with a frequency divider.

The synthesizer circuitry 1428 may be configured to synthesize an output frequency for use by the mixer circuitry 1422 of the RF circuitry 1402 based on a frequency input and a divider control input. In some embodiments, the synthesizer circuitry 1428 may be a fractional N/N+1 synthesizer.

In some embodiments, frequency input may be provided by a voltage controlled oscillator (VCO), although that is not a requirement. Divider control input may be provided by either the baseband circuitry 1404 or the application circuitry 1406 (such as an applications processor) depending on the desired output frequency. In some embodiments, a divider control input (e.g., N) may be determined from a look-up table based on a channel indicated by the application circuitry 1406.

Synthesizer circuitry 1428 of the RF circuitry 1402 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1428 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RE circuitry 1402 may include an IQ/polar converter.

The FEM circuitry 1432 may include a receive signal path which may include circuitry configured to operate on RE signals received from one or more antennas 1430, amplify the received signals and provide the amplified versions of the received signals to the RE circuitry 1402 for further processing. The FEM circuitry 1432 may also include a transmit signal path which may include circuitry configured to amplify signals for transmission provided by the RE circuitry 1402 for transmission by one or more of the one or more antennas 1430. In various embodiments, the amplification through the transmit or receive signal paths may be done solely in the RE circuitry 1402, solely in the FEM circuitry 1432, or in both the RE circuitry 1402 and the FEM circuitry 1432.

In some embodiments, the FEM circuitry 1432 may include a TX/RX switch to switch between transmit mode and receive mode operation. The FEM circuitry 1432 may include a receive signal path and a transmit signal path. The receive signal path of the FEM circuitry 1432 may include an LNA to amplify received RE signals and provide the amplified received RF signals as an output (e.g., to the RF circuitry 1402). The transmit signal path of the FEM circuitry 1432 may include a power amplifier (PA) to amplify input RE signals (e.g., provided by the RF circuitry 1402), and one or more filters to generate RF signals for subsequent transmission (e.g., by one or more of the one or more antennas 1430).

In some embodiments, the PMC 1434 may manage power provided to the baseband circuitry 1404. In particular, the PMC 1434 may control power-source selection, voltage scaling, battery charging, or DC-to-DC conversion. The PMC 1434 may often be included when the device 1400 is capable of being powered by a battery, for example, when the device 1400 is included in a UE. The PMC 1434 may increase the power conversion efficiency while providing desirable implementation size and heat dissipation characteristics.

FIG. 14 shows the PMC 1434 coupled only with the baseband circuitry 1404. However, in other embodiments, the PMC 1434 may be additionally or alternatively coupled with, and perform similar power management operations for, other components such as, but not limited to, the application circuitry 1406, the RF circuitry 1402, or the FEM circuitry 1432.

In some embodiments, the PMC 1434 may control, or otherwise be part of, various power saving mechanisms of the device 1400. For example, if the device 1400 is in an RRC_Connected state, where it is still connected to the RAN node as it expects to receive traffic shortly, then it may enter a state known as Discontinuous Reception Mode (DRX) after a period of inactivity. During this state, the device 1400 may power down for brief intervals of time and thus save power.

If there is no data traffic activity for an extended period of time, then the device 1400 may transition off to an RRC_Idle state, where it disconnects from the network and does not perform operations such as channel quality feedback, handover, etc. The device 1400 goes into a very low power state and it performs paging where again it periodically wakes up to listen to the network and then powers down again. The device 1400 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1406 and processors of the baseband circuitry 1404 may be used to execute elements of one or more instances of a protocol stack. For example, processors of the baseband circuitry 1404, alone or in combination, may be used to execute Layer 3, Layer 2, or Layer 1 functionality, while processors of the application circuitry 1406 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 15:
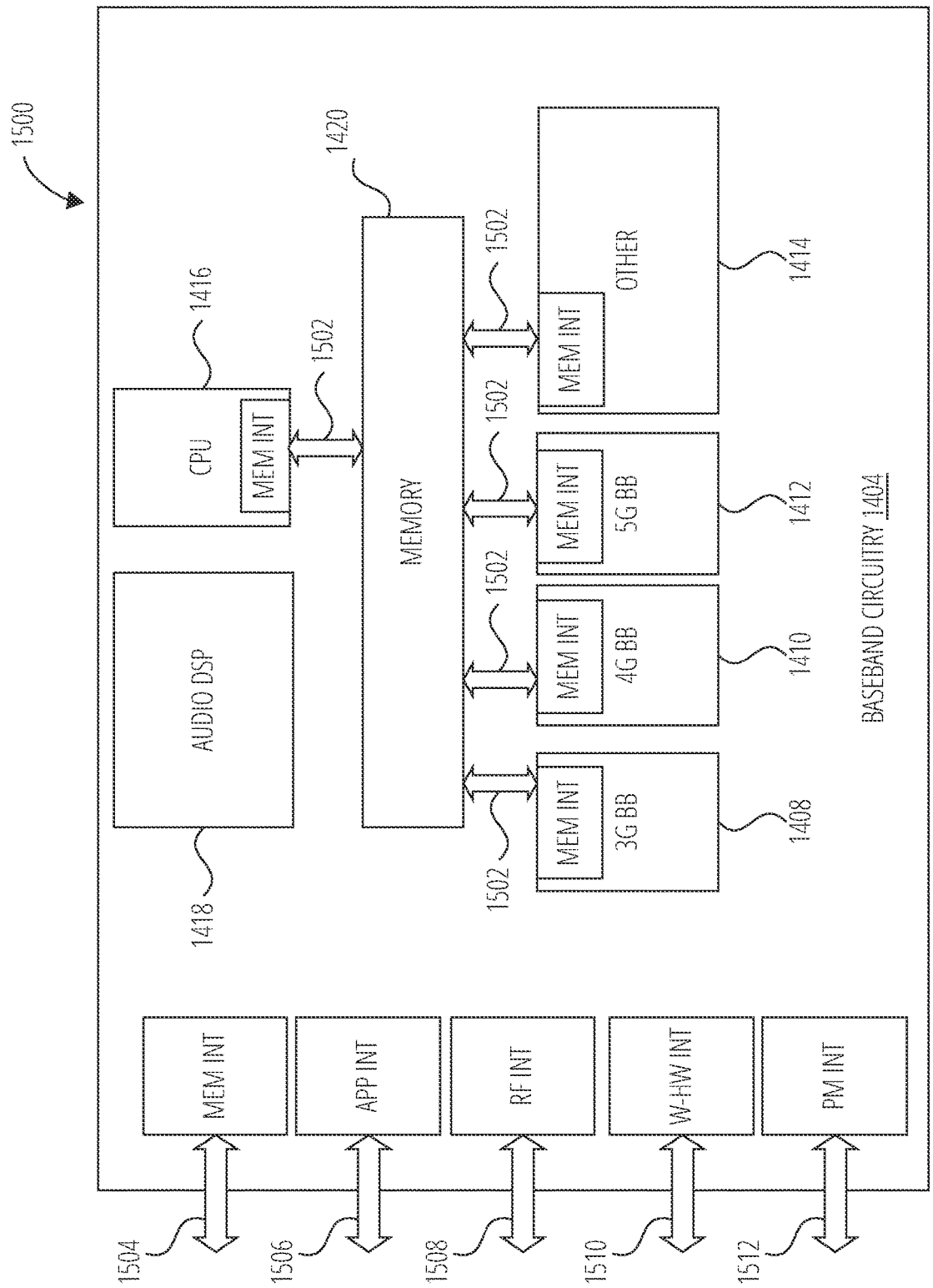
FIG. 15 illustrates example interfaces in accordance with one embodiment.

FIG. 15 illustrates example interfaces 1500 of baseband circuitry in accordance with some embodiments. As discussed above, the baseband circuitry 1404 of FIG. 14 may comprise 3G baseband processor 1408, 4G baseband processor 1410, 5G baseband processor 1412, other baseband processor(s) 1414, CPU 1416, and a memory 1420 utilized by said processors. As illustrated, each of the processors may include a respective memory interface 1502 to send/receive data to/from the memory 1420.

The baseband circuitry 1404 may further include one or more interfaces to communicatively couple to other circuitries/devices, such as a memory interface 1504 (e.g., an interface to send/receive data to/from memory external to the baseband circuitry 1404), an application circuitry interface 1506 (e.g., an interface to send/receive data to/from the application circuitry 1406 of FIG. 14), an RF circuitry interface 1508 (e.g., an interface to send/receive data to/from RF circuitry 1402 of FIG. 14), a wireless hardware connectivity interface 1510 (e.g., an interface to send/receive data to/from Near Field Communication (NFC) components, Bluetooth® components (e.g., Bluetooth® Low Energy), Wi-Fi® components, and other communication components), and a power management interface 1512 (e.g., an interface to send/receive power or control signals to/from the PMC 1434.

Figure 16:
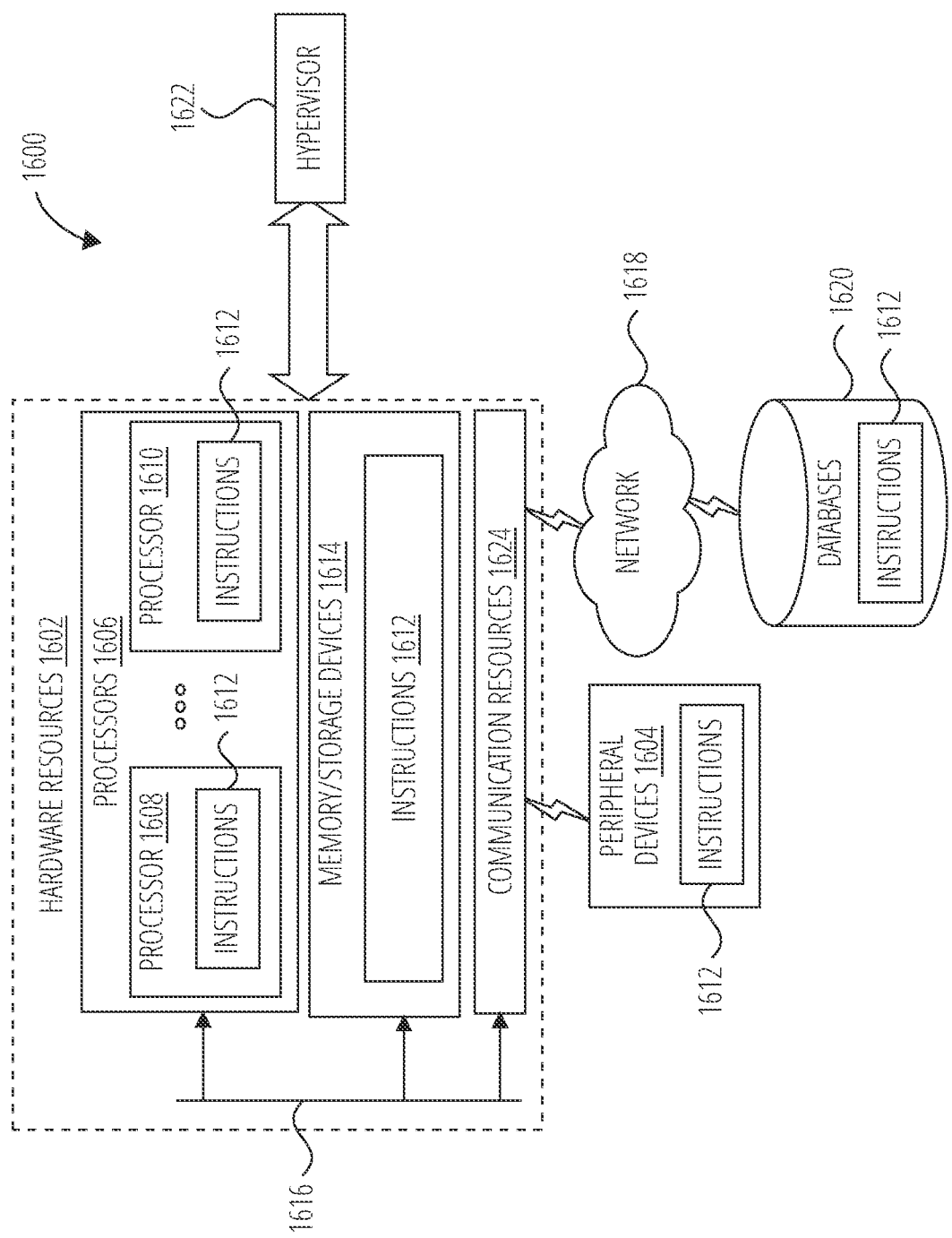
FIG. 16 illustrates components in accordance with one embodiment.

FIG. 16 is a block diagram illustrating components 1600, according to some example embodiments, able to read instructions from a machine-readable or computer-readable medium (e.g., a non-transitory machine-readable storage medium) and perform any one or more of the methodologies discussed herein. Specifically, FIG. 16 shows a diagrammatic representation of hardware resources 1602 including one or more processors 1606 (or processor cores), one or more memory/storage devices 1614, and one or more communication resources 1624, each of which may be communicatively coupled via a bus 1616. For embodiments where node virtualization (e.g., NFV) is utilized, a hypervisor 1622 may be executed to provide an execution environment for one or more network slices/sub-slices to utilize the hardware resources 1602.

The processors 1606 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1608 and a processor 1610.

The memory/storage devices 1614 may include main memory, disk storage, or any suitable combination thereof. The memory/storage devices 1614 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1624 may include interconnection or network interface components or other suitable devices to communicate with one or more peripheral devices 1604 or one or more databases 1620 via a network 1618. For example, the communication resources 1624 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1612 may comprise software, a program, an application, an applet, an app, or other executable code for causing at least any of the processors 1606 to perform any one or more of the methodologies discussed herein. The instructions 1612 may reside, completely or partially, within at least one of the processors 1606 (e.g., within the processor's cache memory), the memory/storage devices 1614, or any suitable combination thereof. Furthermore, any portion of the instructions 1612 may be transferred to the hardware resources 1602 from any combination of the peripheral devices 1604 or the databases 1620. Accordingly, the memory of the processors 1606, the memory/storage devices 1614, the peripheral devices 1604, and the databases 1620 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1. A method for a user equipment (LIE), comprising: receiving multiple signals causing a Quasi co-location TypeD (QCL-TypeD) collision, wherein the multiple signals are configured in one of two transmission schemes within a band or band group and overlapped in time domain, and where two Transmission Configuration Indicator (TCI) States can be applied for PDSCH; determining which of the multiple signals to receive based on a type of transmission scheme associated with each of the multiple signals and one of a signal reception priority rule, a scheduling restriction, or a QCL-TypeD selection priority rule; and processing a received signal based on which of the multiple signal are determined to be received based on the type of transmission scheme associated with each of the multiple signals and one of the signal reception priority rule, the scheduling restriction, or the QCL-TypeD selection priority rule.

Example 2. The method of Example 1, wherein determining which of the multiple signals to receive comprises using one or both TCI States applied for Physical Downlink Control Channel (PDCCH) for Physical Downlink Shared Channel (PDSCH) reception.

Example 3. The method of Example 2, further comprising receiving an RRC parameter indicating whether one or two TCI states applied for PDCCH will be used for PDSCH reception.

Example 4. The method of Example 1 wherein to determine which of the multiple signals to receive, the QCL-TypeD for one of the TCI States applied for PDCCH should be the same as the QCL-TypeD configured for Channel-State Information Reference Signal (CSI-RS) with repetition equal to off.

Example 5. The method of Example 1, wherein to determine which of the multiple signals to receive, the QCL-TypeD for one of search spaces or Control Resource Sets (CORESETs) for PDCCH is the same as the QCL-TypeD configured for CSI-RS with repetition equal to off.

Example 6. The method of Example 1, wherein to determine which of the multiple signals to receive, one of the TCI States applied for PDCCH is used for aperiodic CSI-RS reception.

Example 7. The method of Example 6, wherein whether to select a first or a second TCI is indicated by scheduling Downlink Control Information (DCI).

Example 8. The method of Example wherein to determine which of the multiple signals to receive, a source RS to provide QCL-TypeD indication for at least one of the TCI States applied for PDSCH is QCL-ed with SSB with QCL-TypeD.

Example 9. The method of Example 1, wherein to determine which of the multiple signals to receive, a priority from the signal reception priority rule or the QCL-TypeD selection priority rule is determined by search space type, search space index, component carrier index as well as a number of TCI States in a CORESET, wherein if a selected CORESET has two TCI States, other normal PDCCH QCLed with one of the two TCI States can be selected.

Example 10. The method of Example 1, wherein to determine which of the multiple signals to receive, a priority from the signal reception priority rule or the QCL-TypeD selection priority rule can be determined per TCI States pair.

Example 11. A user equipment (UE) comprising: a baseband processing unit; and a memory storing instructions that, when executed by the baseband processing unit, configure the UF, to: receive multiple signals causing a Quasi co-location TypeD (QCL-TypeD) collision, wherein the multiple signals are configured in one of two transmission schemes within a band or band group and overlapped in time domain, and where two Transmission Configuration Indicator (TCI) States can be applied for PDSCH; determine which of the multiple signals to receive based on a type transmission scheme associated with each of the multiple signals and one of a signal reception priority rule, a scheduling restriction, or a QCL-TypeD selection priority rule; and process a received signal based on which of the multiple signal are determined to be received based on the type of transmission scheme associated with each of the multiple signals and one of the signal reception priority rule, the scheduling restriction, or the QCL-TypeD selection priority rule.

Example 12. The UE of Example 11, wherein determining which of the multiple signals to receive comprises use one or both TCI States applied for Physical Downlink Control Channel (PDCCH) for Physical Downlink Shared Channel (PDSCH) reception.

Example 13. The UE of Example 12, wherein the instructions further configure the UE to receive an RRC parameter indicating whether one or two TCI states applied for PDCCH will be used for PDSCH reception.

Example 14. The UE of Example 11 wherein to determine which of the multiple signals to receive, the QCL-TypeD for one of the TCI States applied for PDCCH should be the same as the QCL-TypeD configured for Channel-State Information Reference Signal (CSI-RS) with repetition equal to off.

Example 15. The UE of Example 11, wherein to determine which of the multiple signals to receive, the QCL-TypeD for one of the search spaces or CORESETs for PDCCH is the same as the QCL-TypeD configured for CSI-RS with repetition equal to off.

Example 16. The UE of Example 11, wherein to determine which of the multiple signals to receive, one of the TCI States applied for PDCCH is used for aperiodic CSI-RS reception.

Example 17. The UE of Example 11, whether to select a first or a second TCI is indicated by scheduling Downlink Control Information (DCI).

Example 18. The UE of Example 11, wherein to determine which of the multiple signals to receive, a source RS to provide QCL-TypeD indication for at least one of the TCI States applied for PDSCH is QCL-ed with SSB with QCL-TypeD.

Example 19. The UE of Example 11, wherein to determine which of the multiple signals to receive, a priority from the signal reception priority rule or the QCL-TypeD selection priority rule is determined by search space type, search space index, component carrier index as well as a number of TCI States in a CORESET, wherein if a selected CORESET has two TCI States, other normal PDCCH QCLed with one of the two TCI States can be selected Example 20. The UE of Example 11, wherein to determine which of the multiple signals to receive, a priority from the signal reception priority rule or the QCL-TypeD selection priority rule can be determined per TCI States pair.

Example 21 may include an apparatus comprising means to perform one or more elements of a method described in or related to any of the above Examples, or any other method or process described herein.

Example 22 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 23 may include an apparatus comprising logic, modules, or circuitry to perform one or more elements of a method described in or related to any of the above Examples, or any other method or process described herein.

Example 24 may include a method, technique, or process as described in or related to any of the above Examples, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 26 may include a signal as described in or related to any of the above Examples, or portions or parts thereof.

Example 27 may include a datagram, packet, frame, segment, protocol data unit (PDU), or message as described in or related to any of the above Examples, or portions or parts thereof, or otherwise described in the present disclosure.

Example 28 may include a signal encoded with data as described in or related to any of the above Examples, or portions or parts thereof, or otherwise described in the present disclosure.

Example 29 may include a signal encoded with a datagram, packet, frame, segment, PDT, or message as described in or related to any of the above Examples, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 31 may include a computer program comprising instructions, wherein execution of the program by a processing element is to cause the processing element to carry out the method, techniques, or process as described in or related to any of the above Examples, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The invention claimed is:

1. A method for a user equipment (UE), comprising:
receiving multiple signals causing a Quasi co-location TypeD (QCL-TypeD) collision, wherein the multiple signals are configured in one of two transmission schemes, wherein the two transmission schemes comprise a first transmission scheme type where the signals are transmitted in a single frequency network (SFN) manner and a second transmission scheme type where the signals are transmitted in a non-SFN manner within a band or band group and overlapped in time domain, and where two Transmission Configuration Indicator (TCI) States are applicable for PDCCH;
determining which of the multiple signals to receive based on whether a type of transmission scheme associated with each of the multiple signals uses the SFN manner or the non-SFN manner and one of a signal reception priority rule, a scheduling restriction, or a QCL-TypeD selection priority rule;
selecting one or more highest priority Search Spaces (SSs) based on the signal reception priority rule or the QCL-TypeD selection priority rule, wherein when two SSs are selected with the two TCI states, other normal PDCCH Quasi co-located with one of the two TCI States are also selected; and
processing a received signal from the one or more highest priority SSs and the other normal PDCCH Quasi co-located with one of the two TCI States based on which of the multiple signal are determined to be received based on the type of transmission scheme associated with each of the multiple signals and one of the signal reception priority rule, the scheduling restriction, or the QCL-TypeD selection priority rule.

2. The method of claim 1, wherein determining which of the multiple signals to receive comprises using one or both TCI States applied for Physical Downlink Control Channel (PDCCH) for Physical Downlink Shared Channel (PDSCH) reception.

3. The method of claim 2, further comprising receiving an RRC parameter indicating whether one or two TCI states applied for PDCCH will be used for PDSCH reception.

4. The method of claim 1 wherein to determine which of the multiple signals to receive, the QCL-TypeD for one of the TCI States applied for PDCCH is the same as the QCL-TypeD configured for Channel-State Information Reference Signal (CSI-RS) with repetition equal to off.

5. The method of claim 1, wherein to determine which of the multiple signals to receive, the QCL-TypeD for one of search spaces or Control Resource Sets (CORESETs) for PDCCH is the same as the QCL-TypeD configured for CSI-RS with repetition equal to off.

6. The method of claim 1, wherein to determine which of the multiple signals to receive, one of the TCI States applied for PDCCH is used for aperiodic CSI-RS reception.

7. The method of claim 6, wherein whether to select a first or a second TCI is indicated by scheduling Downlink Control Information (DCI).

8. The method of claim 1, wherein to determine which of the multiple signals to receive, a source RS to provide QCL-TypeD indication for at least one of the TCI States applied for PDSCH is QCL-ed with SSB with QCL-TypeD.

9. The method of claim 1, wherein to determine which of the multiple signals to receive, a priority from the signal reception priority rule or the QCL-TypeD selection priority rule is determined by search space type, search space index, component carrier index as well as a number of TCI States in a CORESET,
wherein if a selected CORESET has two TCI States, other normal PDCCH QCLed with one of the two TCI States can be selected.

10. The method of claim 1, wherein to determine which of the multiple (Original) signals to receive, a priority from the signal reception priority rule or the QCL-TypeD selection priority rule can be determined per TCI States pair.

11. A user equipment (UE) comprising:
a baseband processing unit; and
a memory storing instructions that, when executed by the baseband processing unit, configure the UE to:
receive multiple signals causing a Quasi co-location TypeD (QCL-TypeD) collision, wherein the multiple signals are configured in one of two transmission schemes, wherein the two transmission schemes comprise a first transmission scheme type where the signals are transmitted in a single frequency network (SFN) manner and a second transmission scheme type where the signals are transmitted in a non-SFN manner within a band or band group and overlapped in time domain, and where two Transmission Configuration Indicator (TCI) States can be applied for PDCCH;
determine which of the multiple signals to receive based on whether a type transmission scheme associated with each of the multiple signals uses the SFN manner or the non-SFN manner and one of a signal reception priority rule, a scheduling restriction, or a QCL-TypeD selection priority rule;
select one or more highest priority Search Spaces (SSs) based on the signal reception priority rule or the QCL-TypeD selection priority rule, wherein when two SSs are selected with the two TCI states, other normal PDCCH Quasi co-located with one of the two TCI States are also selected; and
process a received signal from the one or more highest priority SSs and the other normal PDCCH Quasi co-located with one of the two TCI States based on which of the multiple signal are determined to be received based on the type of transmission scheme associated with each of the multiple signals and one of the signal reception priority rule, the scheduling restriction, or the QCL-TypeD selection priority rule.

12. The UE of claim 11, wherein determining which of the multiple signals to receive comprises use one or both TCI States applied for Physical Downlink Control Channel (PDCCH) for Physical Downlink Shared Channel (PDSCH) reception.

13. The UE of claim 12, wherein the instructions further configure the UE to receive an RRC parameter indicating whether one or two TCI states applied for PDCCH will be used for PDSCH reception.

14. The UE of claim 11 wherein to determine which of the multiple signals to receive, the QCL-TypeD for one of the TCI States applied for PDCCH should be the same as the QCL-TypeD configured for Channel-State Information Reference Signal (CSI-RS) with repetition equal to off.

15. The UE of claim 11, wherein to determine which of the multiple signals to receive, the QCL-TypeD for one of search spaces or CORESETs for PDCCH is the same as the QCL-TypeD configured for CSI-RS with repetition equal to off.

16. The UE of claim 11, wherein to determine which of the multiple signals to receive, one of the TCI States applied for PDCCH is used for aperiodic CSI-RS reception.

17. The UE of claim 11, whether to select a first or a second TCI is indicated by scheduling Downlink Control Information (DCI).

18. The UE of claim 11, wherein to determine which of the multiple signals to receive, a source RS to provide QCL-TypeD indication for at least one of the TCI States applied for PDSCH is QCL-ed with SSB with QCL-TypeD.

19. The UE of claim 11 wherein to determine which of the multiple signals to receive, a priority from the signal reception priority rule or the QCL-TypeD selection priority rule is determined by search space type, search space index, component carrier index as well as a number of TCI States in a CORESET, wherein if a selected CORESET has two TCI States, other normal PDCCH QCLed with one of the two TCI States can be selected.

20. The UE of claim 11, wherein to determine which of the multiple signals to receive, a priority from the signal reception priority rule or the QCL-TypeD selection priority rule can be determined per TCI States pair.

* * * * *